US008572615B2

(12) United States Patent
Inoue et al.

(10) Patent No.: US 8,572,615 B2
(45) Date of Patent: Oct. 29, 2013

(54) PARALLEL COMPUTING SYSTEM, SYNCHRONIZATION DEVICE, AND CONTROL METHOD OF PARALLEL COMPUTING SYSTEM

(75) Inventors: Tomohiro Inoue, Kawasaki (JP); Yuichiro Ajima, Kawasaki (JP); Shinya Hiramoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/325,152

(22) Filed: Dec. 14, 2011

(65) Prior Publication Data

US 2012/0159019 A1 Jun. 21, 2012

(30) Foreign Application Priority Data

Dec. 17, 2010 (JP) ................................. 2010-282189

(51) Int. Cl.
*G06F 9/46* (2006.01)
(52) U.S. Cl.
USPC ........... 718/100; 718/102; 718/106; 709/248; 710/58; 710/59; 710/61; 712/28; 712/29; 712/30
(58) Field of Classification Search
None
See application file for complete search history.

(56) References Cited

U.S. PATENT DOCUMENTS

| 5,765,009 | A | * | 6/1998 | Ishizaka | 712/16 |
|---|---|---|---|---|---|
| 5,832,261 | A | * | 11/1998 | Ishizaka et al. | 718/100 |
| 5,928,351 | A | * | 7/1999 | Horie et al. | 712/11 |
| 5,978,830 | A | * | 11/1999 | Nakaya et al. | 718/102 |
| 6,216,174 | B1 | * | 4/2001 | Scott et al. | 713/375 |
| 6,643,763 | B1 | * | 11/2003 | Starke et al. | 712/11 |
| 7,100,021 | B1 | * | 8/2006 | Marshall et al. | 712/19 |
| 7,861,060 | B1 | * | 12/2010 | Nickolls et al. | 712/22 |
| 7,971,029 | B2 | * | 6/2011 | Unno et al. | 712/28 |
| 8,108,660 | B2 | * | 1/2012 | Kasahara et al. | 712/225 |
| 2006/0059489 | A1 | * | 3/2006 | Koyanagi | 718/100 |

(Continued)

FOREIGN PATENT DOCUMENTS

| EP | 2189903 A2 | 5/2012 |
|---|---|---|
| JP | 06-110845 A | 4/1994 |
| JP | 10-049507 A | 2/1998 |
| JP | 2010-122848 A | 6/2010 |

OTHER PUBLICATIONS

'Efficient Implementation of Barrier Synchronization in Wormhole-Routed Hypercube Multicomputers' by Hong Xu et al., from the 12th International Conference on Distributed Computing Systems, Yokohama, Japan, Jun. 1992.*

(Continued)

*Primary Examiner* — Steven Snyder
(74) *Attorney, Agent, or Firm* — Fujitsu Patent Center

(57) ABSTRACT

A synchronization device includes a receiver that receives data from at least two synchronization devices establishing synchronization, and extracts synchronization information and register selection information from the received data, a transmitter that transmits data to each of the at least two synchronization devices establishing synchronization among a plurality of synchronization devices, a first and a second receiving state register that each stores the extracted synchronization information, a second receiving state register that stores the extracted synchronization information, and a controller that stores the extracted synchronization information into the first receiving state register and the second receiving state register alternately based on the register selection information, and controls the transmitter to transmit data including the register selection information to each of the at least two synchronization devices when the extracted synchronization information is completed in one of the first and the second receiving state register.

12 Claims, 31 Drawing Sheets

(56) References Cited

U.S. PATENT DOCUMENTS

2008/0077921 A1* 3/2008 Chaudhary et al. .......... 718/100
2009/0193228 A1* 7/2009 Kasahara et al. ............. 712/29
2010/0124241 A1   5/2010 Hiramoto et al.
2010/0260168 A1* 10/2010 Gheorghiu et al. .......... 370/350

OTHER PUBLICATIONS

'Turn Grouping for Efficient Barrier Synchronization in Wormhole Mesh Networks' by Kuo-Pao Fan and Chung-Ta King, copyright 1997, IEEE.*

Extended European Search Report dated Apr. 11, 2012, for corresponding European Application No. 11193457.6.
Hoefler, Torsten et al., "A Survey of Barrier Algorithms for Coarse Grained Supercomputers," Jan. 1, 2004, pp. 1-20, URL:http://citeseerx.ist.psu.edu/viewdoc/summary?doi=10.1.1.83.5369.
Kodama, Yuetsu et al., "The EM-X Parallel Computer: Architecture and Basic Performance," Proceedings $22^{nd}$ Annual International Symposium on Computer Architecture, Jun. 24, 1995, pp. 14-23.
Brooks III, Eugene D., "The Butterfly Barrier," International Journal of Parallel Programming, vol. 15, No. 4, Dec. 1, 1986, pp. 295-307, URL:http://www.springerlink.com/content/tu5n5165r7883243/.

* cited by examiner

FIG. 5

| BYTE | | | | |
|---|---|---|---|---|
| 0 | HEADER CRC | | ROUTING HEADER | |
| 8 | TYPE | DESTINATION NODE ADDRESS | TRANSMISSION SOURCE NODE ADDRESS | |
| 16 | TRANSMISSION SOURCE STAGE NUMBER | DESTINATION STAGE NUMBER | SEQUENCE NUMBER | |
| 20 | PACKET CRC | | | |

FIG. 6

| LEAST SIGNIFICANT BIT OF SEQUENCE NUMBER | SELECTION OF SIGNAL RECEIVING STATE REGISTER |
|---|---|
| 0 | SYNCHRONIZATION MESSAGE DETERMINED TO BE ADDRESSED TO FIRST PLANE |
| 1 | SYNCHRONIZATION MESSAGE DETERMINED TO BE ADDRESSED TO SECOND PLANE |

FIG. 16

|  | START AND END POINT STAGES | OTHER STAGES |
|---|---|---|
| UNISSUED BARRIER | DIFFERENCE = SEQUENCE NUMBER OF PACKET - SEQUENCE NUMBER OF STAGE | |
| ISSUED BARRIER | DIFFERENCE = (SEQUENCE NUMBER OF PACKET - SEQUENCE NUMBER OF STAGE)+1 | |

FIG. 17A
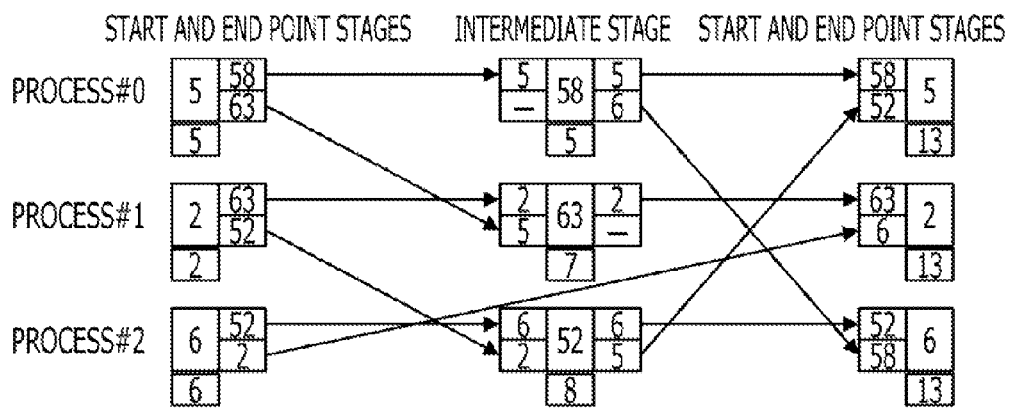
FIG. 17B
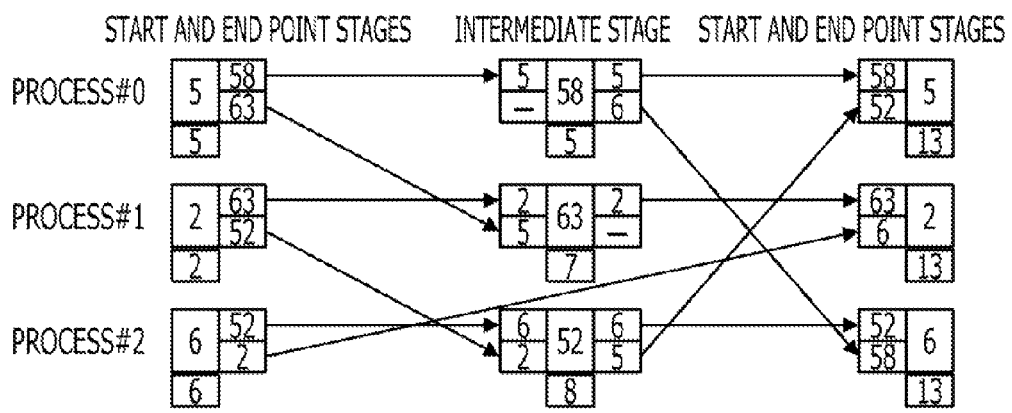
FIG. 17C
| STAGE | ACTUAL SEQUENCE NO. | FIRST PLANE | | | | | SECOND PLANE | | | | |
|---|---|---|---|---|---|---|---|---|---|---|---|
| | | REGISTER VALUE | | | SEQUENCE NUMBER AT ISSUE | SEQUENCE NUMBER AT ESTABLISHMENT | REGISTER VALUE | | | SEQUENCE NUMBER AT ISSUE | SEQUENCE NUMBER AT ESTABLISHMENT |
| | | L | R | S | | | L | R | S | | |
| 5 | 36a | 0 | 0 | 0 | 36a | 36a | 0 | 0 | 0 | 36b | 36b |
| 2 | 36a | 0 | 0 | 0 | 36a | 36a | 0 | 0 | 0 | 36b | 36b |
| 6 | 36a | 0 | 0 | 0 | 36a | 36a | 0 | 0 | 0 | 36b | 36b |

FIG. 18A
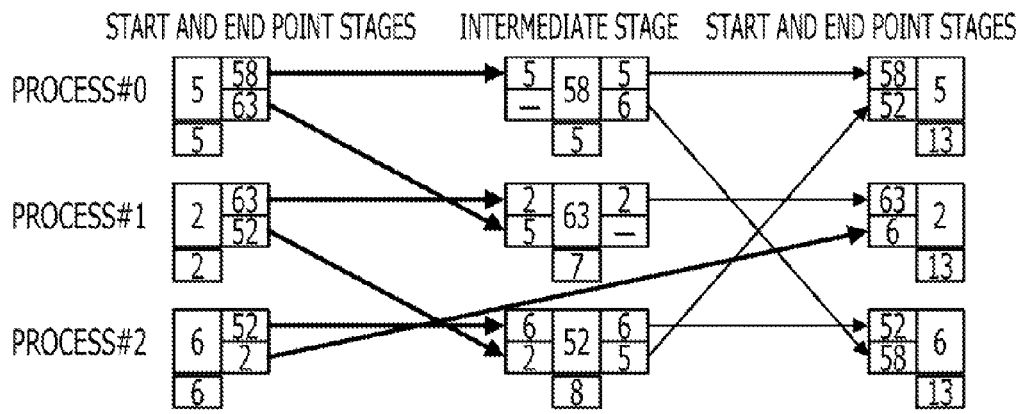
FIG. 18B
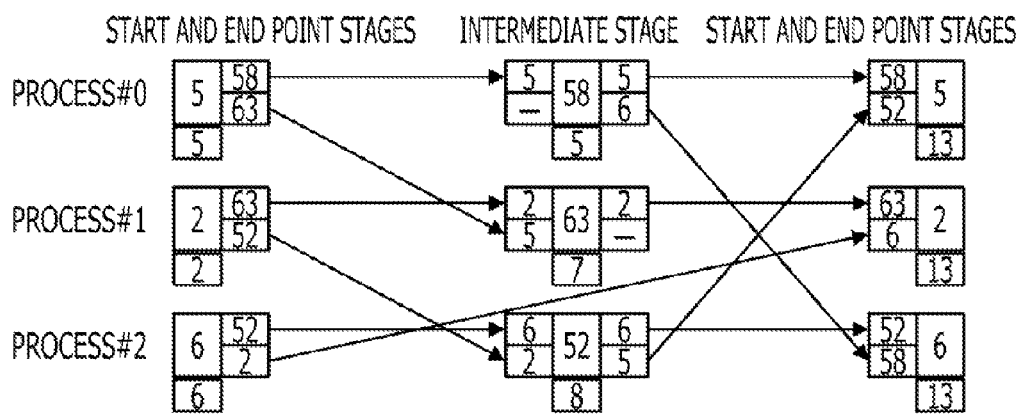
FIG. 18C
| STAGE | ACTUAL SEQUENCE NO. | FIRST PLANE | | | | | SECOND PLANE | | | | |
|---|---|---|---|---|---|---|---|---|---|---|---|
| | | REGISTER VALUE | | | SEQUENCE NUMBER AT ISSUE | SEQUENCE NUMBER AT ESTABLISHMENT | REGISTER VALUE | | | SEQUENCE NUMBER AT ISSUE | SEQUENCE NUMBER AT ESTABLISHMENT |
| | | L | R | S | | | L | R | S | | |
| 5 | 36b | 0 | 0 | 1 | 36c | 36a | 0 | 0 | 0 | 36b | 36b |
| 2 | 36b | 0 | 0 | 1 | 36c | 36a | 0 | 0 | 0 | 36b | 36b |
| 6 | 36b | 0 | 0 | 1 | 36c | 36a | 0 | 0 | 0 | 36b | 36b |

FIG. 19A
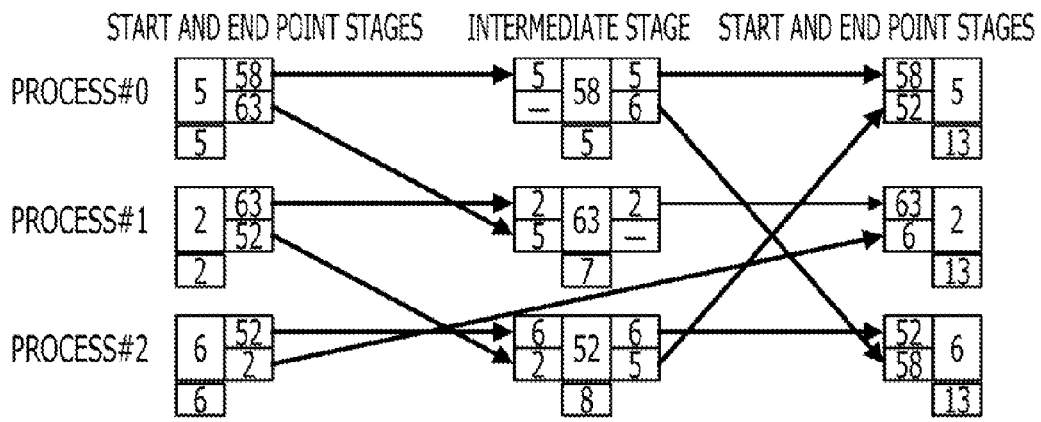
FIRST PLANE
FIG. 19B
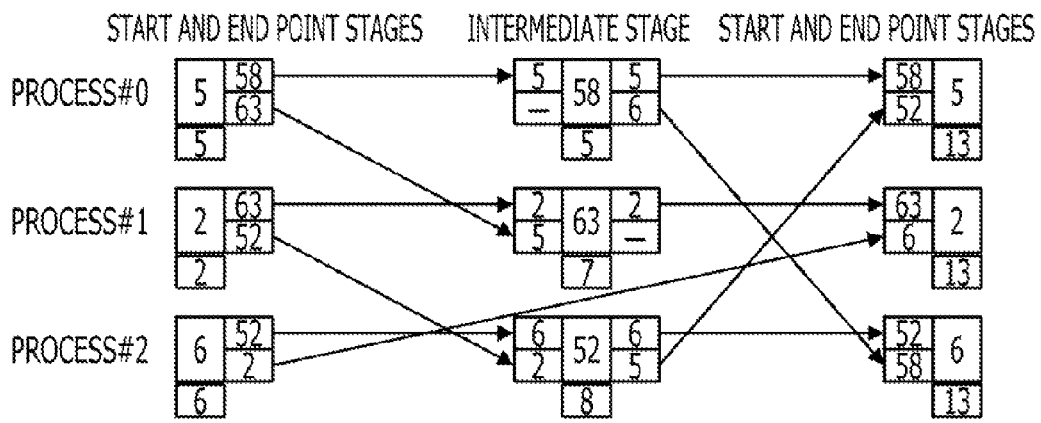
SECOND PLANE
FIG. 19C
| STAGE | ACTUAL SEQUENCE NO. | FIRST PLANE | | | | | SECOND PLANE | | | | |
|---|---|---|---|---|---|---|---|---|---|---|---|
| | | REGISTER VALUE | | | SEQUENCE NUMBER AT ISSUE | SEQUENCE NUMBER AT ESTABLISHMENT | REGISTER VALUE | | | SEQUENCE NUMBER AT ISSUE | SEQUENCE NUMBER AT ESTABLISHMENT |
| | | L | R | S | | | L | R | S | | |
| 5 | 36b | 1 | 1 | 1 | 36c | 36a | 0 | 0 | 0 | 36b | 36b |
| 2 | 36b | (0) | 1 | 1 | 36c | 36a | 0 | 0 | 0 | 36b | 36b |
| 6 | 36b | 1 | 1 | 1 | 36c | 36a | 0 | 0 | 0 | 36b | 36b |

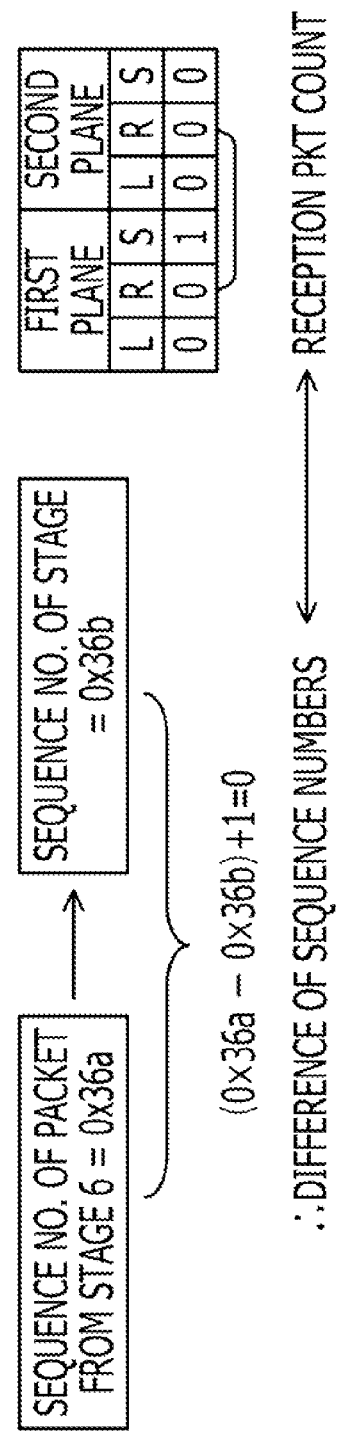

FIG. 21A
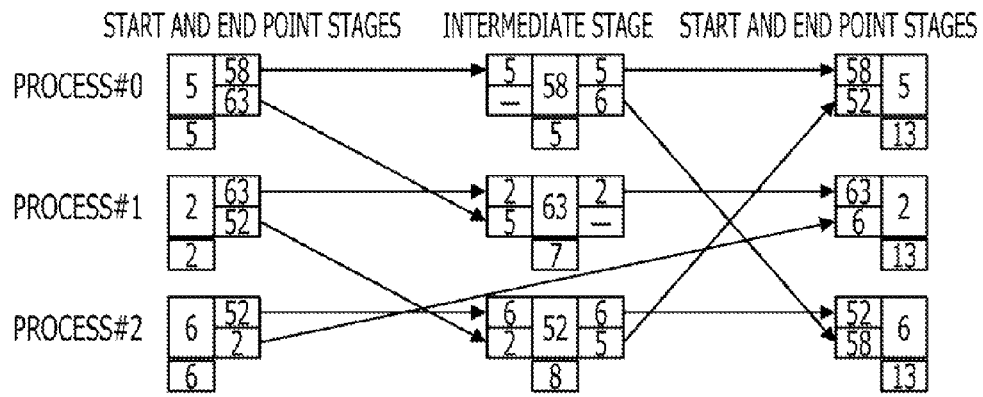
FIG. 21B
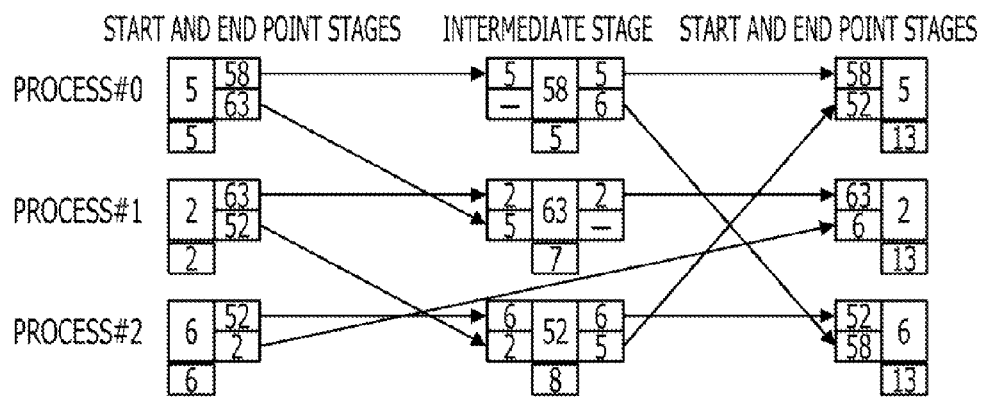
FIG. 21C
| STAGE | ACTUAL SEQUENCE NO. | FIRST PLANE | | | | | SECOND PLANE | | | | |
|---|---|---|---|---|---|---|---|---|---|---|---|
| | | REGISTER VALUE | | | SEQUENCE NUMBER AT ISSUE | SEQUENCE NUMBER AT ESTABLISHMENT | REGISTER VALUE | | | SEQUENCE NUMBER AT ISSUE | SEQUENCE NUMBER AT ESTABLISHMENT |
| | | L | R | S | | | L | R | S | | |
| 5 | 36b | ⓪ | 0 | ⓪ | 36c | 36a | 0 | 0 | 0 | 36b | 36b |
| 2 | 36b | 0 | 1 | 1 | 36c | 36a | 0 | 0 | 0 | 36b | 36b |
| 6 | 36b | ⓪ | 0 | ⓪ | 36c | 36a | 0 | 0 | 0 | 36b | 36b |

FIG. 22A
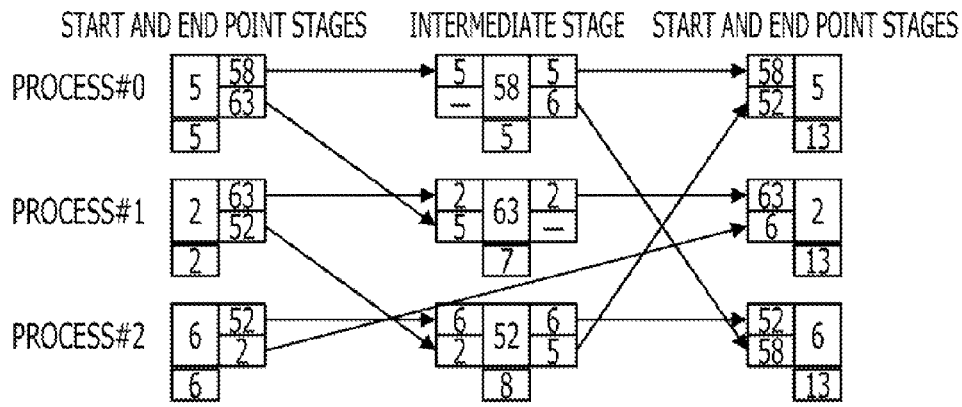
FIG. 22B
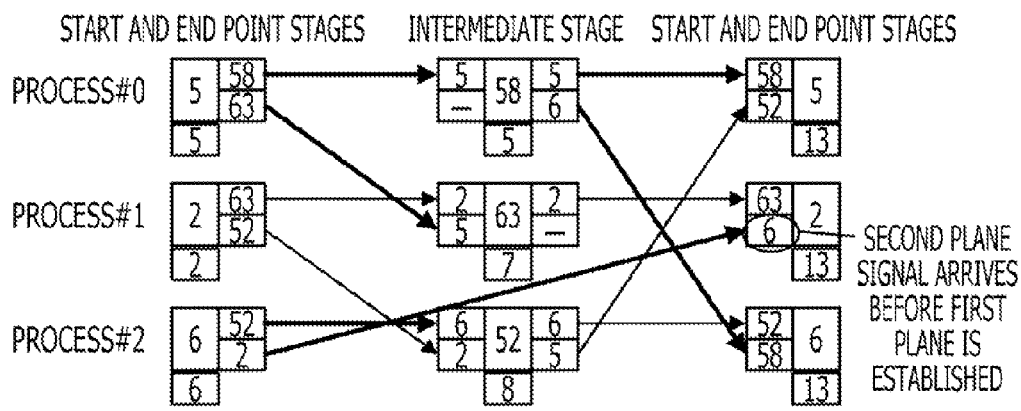
FIG. 22C
| | | FIRST PLANE | | | | SECOND PLANE | | | | |
|---|---|---|---|---|---|---|---|---|---|---|
| STAGE | ACTUAL SEQUENCE NO. | REGISTER VALUE | | | SEQUENCE NUMBER AT ISSUE | SEQUENCE NUMBER AT ESTABLISHMENT | REGISTER VALUE | | | SEQUENCE NUMBER AT ISSUE | SEQUENCE NUMBER AT ESTABLISHMENT |
| | | L | R | S | | | L | R | S | | |
| 5 | 36c | 0 | 0 | 0 | 36c | 36a | 0 | 0 | 1 | 36d | 36b |
| 2 | 36b | 0 | 1 | 1 | 36c | 36a | 0 | 1 | 0 | 36b | 36b |
| 6 | 36c | 0 | 0 | 0 | 36c | 36a | 0 | 0 | 1 | 36d | 36b |

FIG. 24A
FIRST PLANE
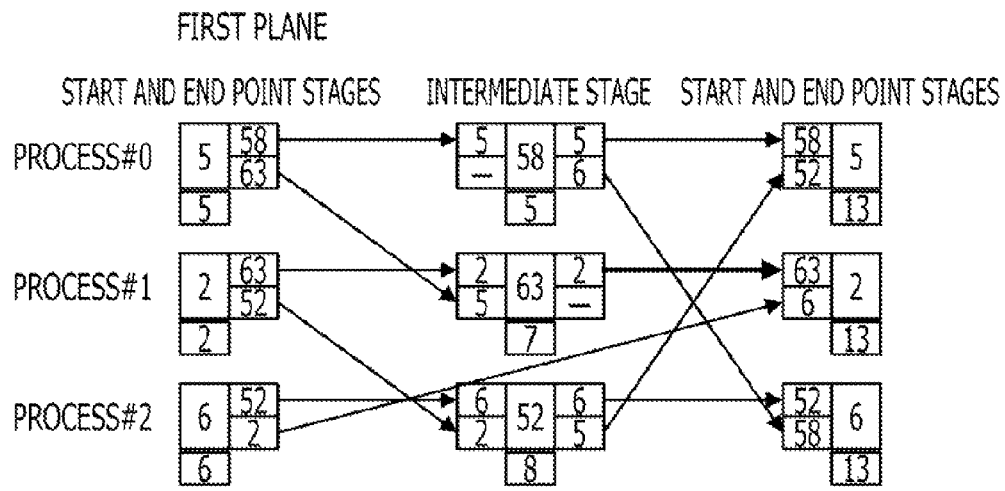
FIG. 24B
SECOND PLANE
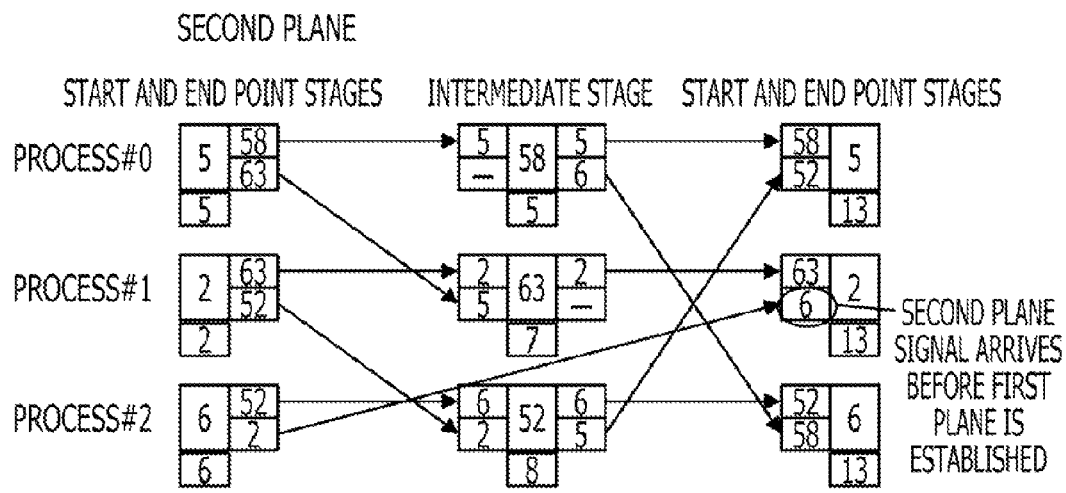
FIG. 24C
| STAGE | ACTUAL SEQUENCE NO. | FIRST PLANE | | | | | SECOND PLANE | | | | |
|---|---|---|---|---|---|---|---|---|---|---|---|
| | | REGISTER VALUE | | | SEQUENCE NUMBER AT ISSUE | SEQUENCE NUMBER AT ESTABLISHMENT | REGISTER VALUE | | | SEQUENCE NUMBER AT ISSUE | SEQUENCE NUMBER AT ESTABLISHMENT |
| | | L | R | S | | | L | R | S | | |
| 5 | 36c | 0 | 0 | 0 | 36c | 36a | 0 | 0 | 1 | 36d | 36b |
| 2 | 36b | ① | 1 | 1 | 36c | 36a | 0 | 1 | 0 | 36b | 36b |
| 6 | 36c | 0 | 0 | 0 | 36c | 36a | 0 | 0 | 1 | 36d | 36b |

FIG. 26A
FIRST PLANE
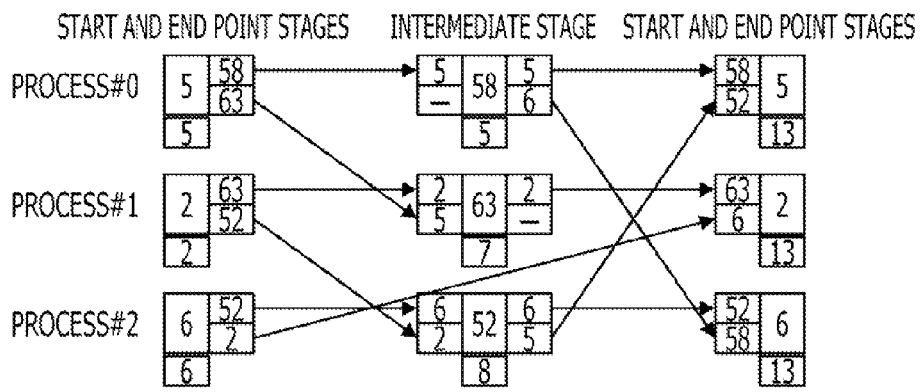
FIG. 26B
SECOND PLANE
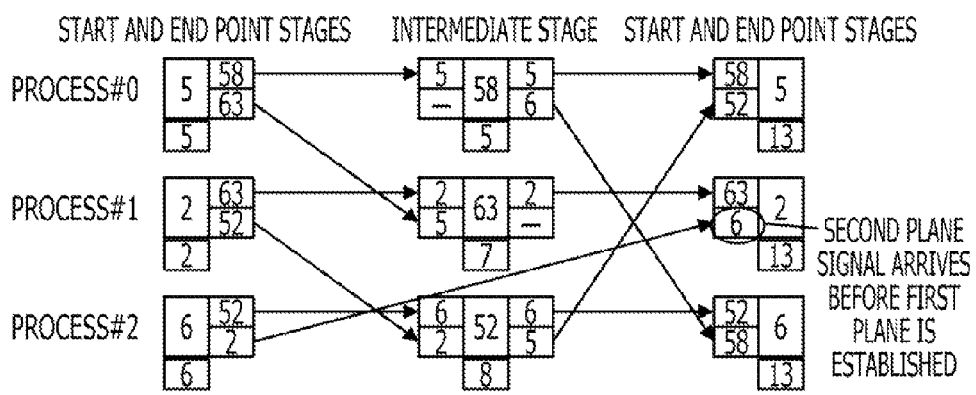
SECOND PLANE SIGNAL ARRIVES BEFORE FIRST PLANE IS ESTABLISHED
FIG. 26C
| STAGE | ACTUAL SEQUENCE NO. | FIRST PLANE | | | | | SECOND PLANE | | | | |
|---|---|---|---|---|---|---|---|---|---|---|---|
| | | REGISTER VALUE | | | SEQUENCE NUMBER AT ISSUE | SEQUENCE NUMBER AT ESTABLISHMENT | REGISTER VALUE | | | SEQUENCE NUMBER AT ISSUE | SEQUENCE NUMBER AT ESTABLISHMENT |
| | | L | R | S | | | L | R | S | | |
| 5 | 36c | 0 | 0 | 0 | 36c | 36a | 0 | 0 | 1 | 36d | 36b |
| 2 | 36b | 0 | 0 | 0 | 36c | 36a | 0 | 1 | 0 | 36b | 36b |
| 6 | 36c | 0 | 0 | 0 | 36c | 36a | 0 | 0 | 1 | 36d | 36b |

PARALLEL COMPUTING SYSTEM, SYNCHRONIZATION DEVICE, AND CONTROL METHOD OF PARALLEL COMPUTING SYSTEM

CROSS-REFERENCE TO RELATED APPLICATIONS

This application is based upon and claims priority to prior Japanese Patent Application No. 2010-282189 filed on Dec. 17, 2010 in the Japan Patent Office, the entire contents of which are incorporated herein by reference.

FIELD

The present invention relates to a parallel computing system, a synchronization device, and a control method of the parallel computer system.

BACKGROUND

In the field of parallel computing system, barrier synchronization is known as a technique of establishing synchronization among a plurality of processes that are performed in parallel processing by a plurality of computing nodes. In the barrier synchronization, a point of synchronization, i.e., a barrier point is set in view of a progress (stage) of the processes. Upon reaching a barrier point in the barrier synchronization, the process is temporarily suspended and the progress of a process at another computing node is awaited. At the moment all the processes performed in a parallel fashion reach the barrier point, an operation of barrier synchronization ends a waiting state, thereby resuming the temporarily suspended process. The synchronization of the parallel processing is thus established among the plurality of processes performed by the plurality of computing nodes.

Depending upon an algorithm in use, a barrier synchronization device in the execution of barrier synchronization may change, on a per stage basis, transmission destinations to which a signal and/or a massage (barrier synchronization message) to the effect that the process has reached the barrier point is to be transmitted. In one barrier synchronization device presented, a transmission destination modification process of the barrier synchronization is implemented using hardware. The barrier synchronization device establishes high-speed barrier synchronization without the intervention of a central processing unit (CPU). Also, the barrier synchronization device includes a synchronization unit that establishes synchronization among a plurality of sets of signals. Even if a plurality of computing nodes are linked to each other via a network, no limitation is imposed on the structure of the network. High-speed barrier synchronization is thus achieved.

A parallel computing apparatus of related art includes a routing controller. The routing controller includes a register storing information relating to a position of the parallel computing apparatus in a barrier synchronization requesting tree. The controller also includes a barrier synchronization control unit performing control in response to a value set in the register. The barrier synchronization control unit transmits a barrier synchronization requesting message when barrier synchronization is ready on its own computing node and on all computing nodes corresponding to routing controllers in its own computing node.

In accordance with an inter-processor data communication method presented, a transmitter side is notified of a physical address of a data receiving region at a receiving side prior to the start of a communication session. The receiver side having double-buffering prevents overwriting on the data receiving region. Partial synchronization with an adjacent computing node is successively performed, leading to automatic establishing of synchronization on all computing nodes. An identifier is attached to the data receiving region, the transmitter side is notified of the identifier prior to the start of a communication session, data with the identifier attached thereto is transmitted to the receiver side, and the receiver side compares the two identifiers. When the two identifiers fail to match each other, an interruption is generated to a processor in the receiver computing node.

The barrier synchronization device in the parallel computing system may perform barrier synchronization successively among a plurality computing nodes. A waiting state to a message relating to a process of a prior barrier synchronization may be canceled by a message to a process of a subsequent barrier synchronization. In other words, there is a possibility that synchronization between the processes is destroyed. It is important that the waiting state to the message relating to the process of the prior barrier synchronization be prevented from being canceled.

It is contemplated that a time interval between a request for a prior barrier synchronization and a request for a subsequent barrier synchronization is set to be long enough. It is also contemplated that a next barrier synchronization is requested in a state that the barrier synchronization of the processes of all computing nodes is complete. A process may receiver earlier a barrier synchronization-established notification that the barrier synchronization of the processes of all computing nodes is complete and may reach a next barrier point. The process still has difficulty in requesting barrier synchronization. It is still difficult to achieve a high-speed barrier synchronization.

It is also contemplated that one computing node may detect the barrier synchronization established on another computing node through a method other than the barrier synchronization. However, since the barrier synchronization is the highest-speed verification method in the parallel computing system. The barrier synchronization is requested to verify the barrier synchronization after all. In other words, a second barrier synchronization is requested to learn the completion of a first barrier synchronization that awaits establishing. As a result, an overhead is caused by introducing double barrier synchronization.

It is an object of the invention to provide a parallel computing system that executes a barrier synchronization process at a high speed while preventing a waiting state of a message of the barrier synchronization from being canceled.

[Patent Document 1] Japanese Laid-open Patent Publication No. 2010-122848

[Patent Document 2] Japanese Laid-open Patent Publication No. 10-049507

[Patent Document 3] Japanese Laid-open Patent Publication No. 06-110845.

SUMMARY

According to an aspect of the invention, a synchronization device includes a receiver that receives data from at least two synchronization devices establishing synchronization, and extracts synchronization information and register selection information from the received data, a transmitter that transmits data to each of the at least two synchronization devices from among a plurality of synchronization devices, a first and a second receiving state register that each stores the extracted synchronization information, a second receiving state register that stores the extracted synchronization information, and a controller that stores the extracted synchronization information into the first receiving state register and the second receiving state register alternately based on the register selection information, and controls the transmitter to transmit data including the register selection information to each of the at least two synchronization devices when the extracted synchronization information is completed in one of the first receiving state register and the second receiving state register.

The object and advantages of the invention will be realized and attained at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 illustrates a format of a packet;

FIG. 6 illustrates synchronization plane selection information;

FIG. 16 illustrates a consistency between a sequence number and a packet number;

FIGS. 17A-17C illustrate a signal flow in the barrier synchronization and the reduction calculation;

FIGS. 18A-18C illustrate a signal flow in the barrier synchronization and the reduction calculation;

FIGS. 19A-19C illustrate a signal flow in the barrier synchronization and the reduction calculation;

FIG. 20 illustrates a signal flow in the barrier synchronization and the reduction calculation;

FIGS. 21A-21C illustrate a signal flow in the barrier synchronization and the reduction calculation;

FIGS. 22A-22C illustrate a signal flow in the barrier synchronization and the reduction calculation;

FIGS. 24A-24C illustrate a signal flow in the barrier synchronization and the reduction calculation;

FIGS. 26A-26C illustrate a signal flow in the barrier synchronization and the reduction calculation;

DESCRIPTION OF EMBODIMENTS

Figure 27:
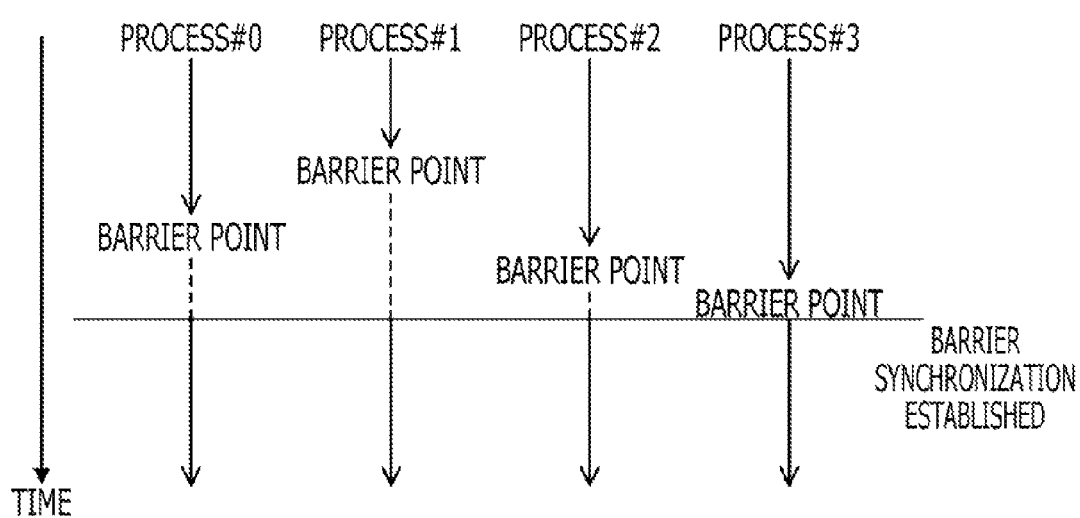
FIG. 27 illustrates the barrier synchronization.

The barrier synchronization is briefly described first. Upon reaching the point of synchronization, i.e., the barrier point, a plurality of processes #0-#3 performing the barrier synchronization suspend the operations thereof as illustrated in FIG. 27. Each of the processes #0-#3 reaches the barrier point thereof, and waits on standby until the other processes reach the barrier points thereof. At the moment all the processes #0-#3 reach the barrier points, i.e., the barrier synchronization is established, a waiting state is canceled, and the suspended process resumes. The plurality of processes performed in parallel are thus synchronized in parallel processing.

One of the algorithms performing the barrier synchronization is butterfly calculation. The butterfly calculation is hereinafter simply referred to as "butterfly." In the butterfly, a process is partitioned into a plurality of stages, and barrier synchronization messages are communicated between the processes on a per stage basis. The butterfly is used here as the algorithm of the barrier synchronization.

Figure 28A:
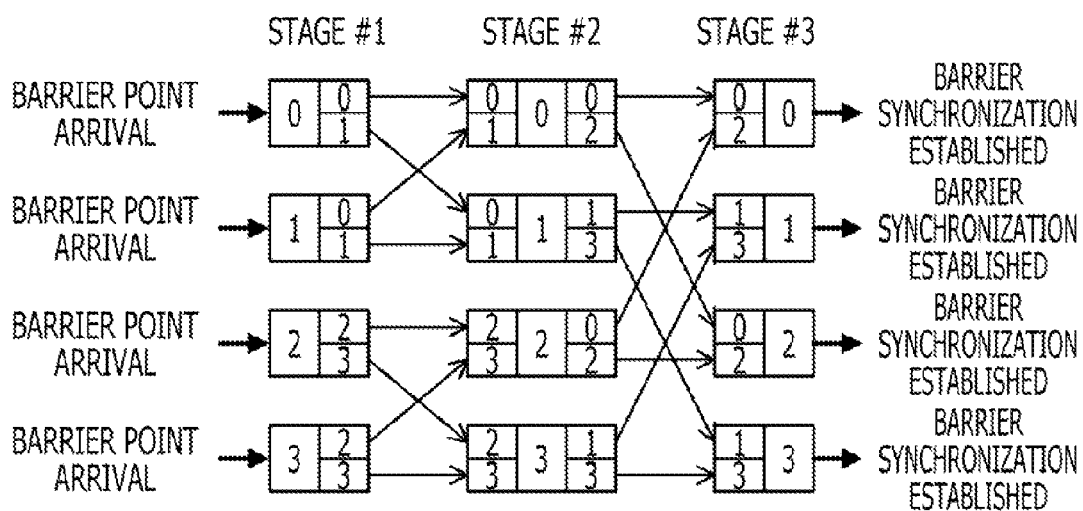
FIGS. 28A and 28B illustrate an example of the barrier synchronization through the butterfly of the four processes.
Figure 28B:
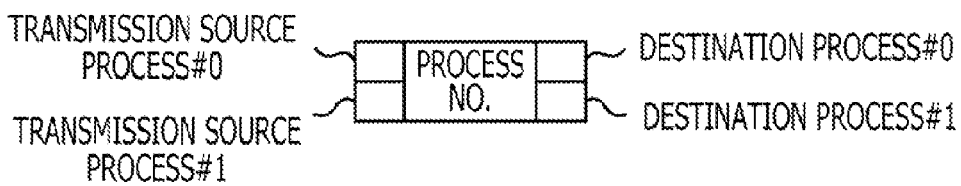

FIG. 28A illustrates the barrier synchronization that is established through the butterfly among the four processes #0-#3. Each process of FIG. 28A is illustrated in detail in FIG. 28B. As illustrated in FIG. 28B, an upper-left number refers to a transmission source process, a lower-left number refers to a transmission source process, a center number refers to own process, an upper-right number refers to a transmission destination process or a destination process, and a lower-right number refers to a transmission destination process or a destination process. Each process is identified by a process number.

A barrier synchronization message (hereinafter also simply referred to as message) indicating that the process has reached the barrier point at each stage is transmitted to a transmission destination. The transmission destination is expressed as i XOR 2^ (k−1), where k represents a stage number, and own process or own node 1 has a process number i. XOR represents exclusive OR gating. The number of stages is log(N) where the number of processes is power of 2.

As illustrated in FIG. 28A, the process #0 is considered. The transmission destinations of the message are preset as below. The transmission destination of the message indicative of the barrier point arrival is the process #1 at the stage #1. At the stage #2, the reception side of the message indicative of the barrier point arrival from the process #0 is the process #1, and the transmission destination of the message indicative of the barrier point arrival from the process #0 is the process #2.

The transmission destination and the reception side are uniquely determined by fixing the structure of the process in a setting condition, e.g., the algorithm of the barrier synchronization and execution condition. In this case, the algorithm of the barrier synchronization is the butterfly, and the execution condition is four processes. The transmission destination and the reception side are thus determined as described above.

The processes mutually exchange the signals of the barrier point arrival on a per stage basis. For example, at the stage #1, the processes reach the barrier synchronization point. The processes are different from each other in arrival times. Each process transmits the signal to a process preset in the next stage in a butterfly network. A parallel computing apparatus performs the barrier synchronization through butterfly.

At the next stage #2, each process awaits a signal from a process preset in the prior stage #1 in the butterfly network. Upon receiving the signal from another process, each process transmits the signal to a process preset at the next process #3.

At the final process #3, each process awaits the signal from a process preset at the prior stage #2. Upon receiving the signal from another process, each process now learns that the barrier synchronization has been established with all the processes #0-#3 having reached the barrier point. Each process then starts a next operation since the barrier synchronization is established.

If the barrier synchronization among the nodes is consecutively executed in the barrier synchronization device in the parallel computing system through the butterfly, the waiting state of the message to the process of a prior barrier synchronization is overwritten by the message to the process of a subsequent barrier synchronization. In other words, the waiting state of the prior barrier synchronization may be destroyed.

Figure 29A:
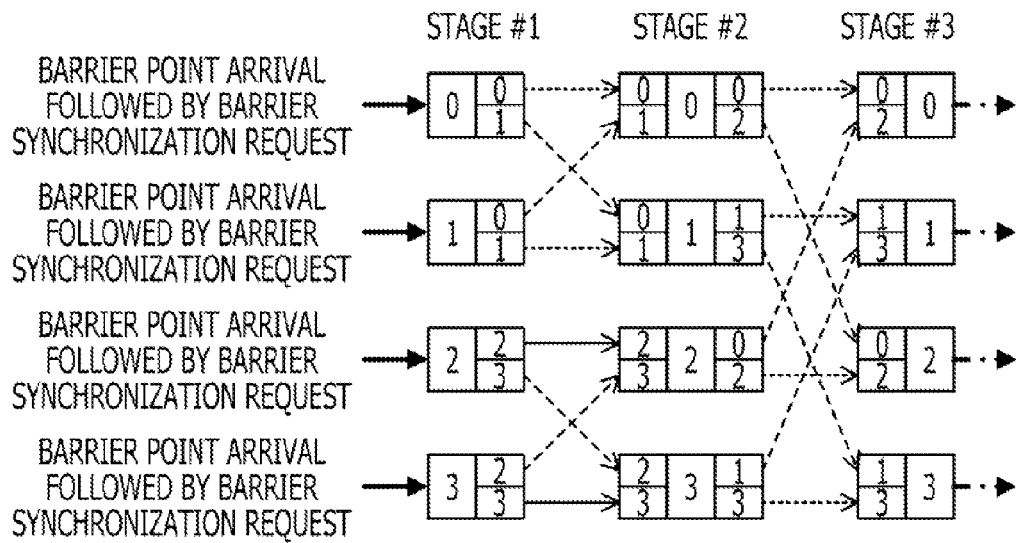
FIGS. 29A and 29B illustrate the barrier synchronization through butterfly.
Figure 29B:
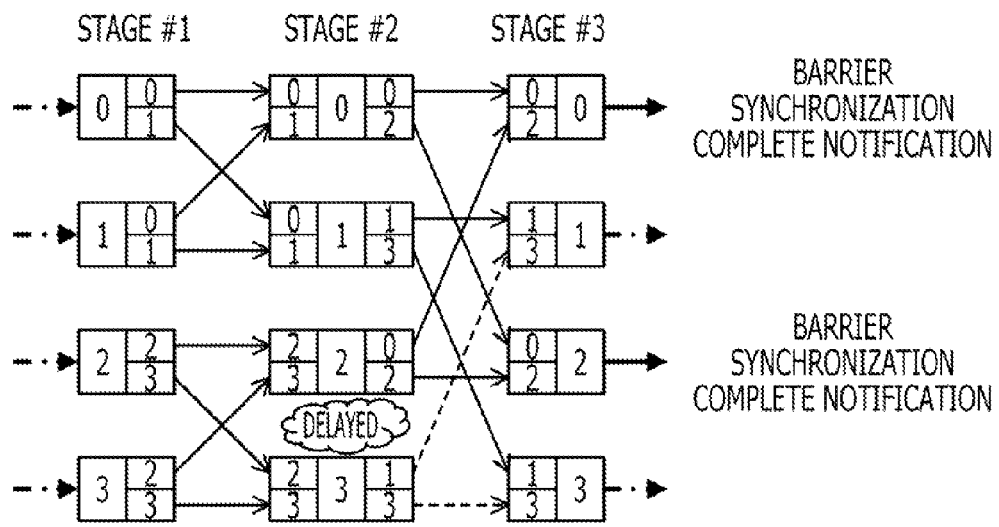

As illustrated in FIG. 29A, four processes #0-#3 execute first operations, reach the barrier point, and output a request for a first barrier synchronization. As illustrated in FIG. 29B, the barrier synchronization messages are exchanged between the four processes #0-#3. A barrier synchronization-complete notification is exchanged between the process #0 and the process #2 with synchronization established between the nodes. The message from the stage #2 to the process #3 may now be delayed. In this case, the process #3 remains at the stage #2, and continuously retains the message of the first barrier synchronization. Because of this delay, inter-node synchronization is not established in the process #1 and the process #3. The process #1 and the process #3 do not receive the barrier synchronization-complete notification.

Figure 30A:
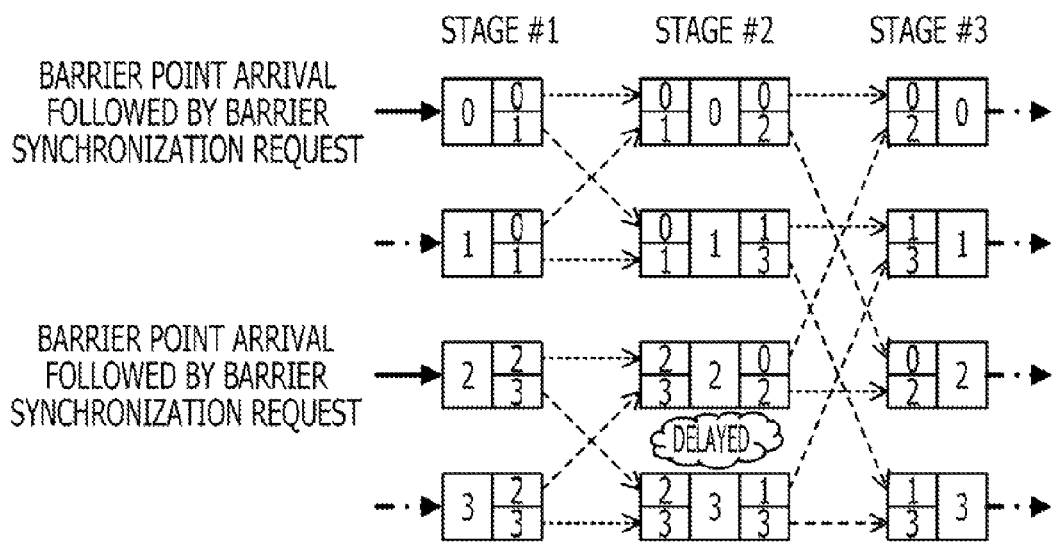
FIGS. 30A and 30B illustrate the barrier synchronization through butterfly.

As illustrated in FIG. 30A, the process #0 and the process #2 perform a next operation, reach the barrier point, and output a request for a second barrier synchronization. Even at this point of time, the message from the stage #2 to the process #3 responsive to the request for the first barrier synchronization may be delayed.

Figure 30B:
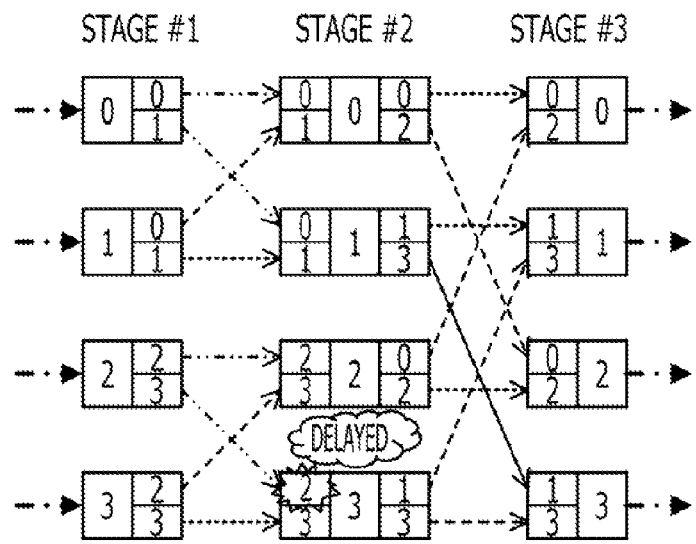

As illustrated in FIG. 30B, the message of the barrier synchronization from the process #2 is transmitted to own process #2 and the process #3 at the stage #1. At the stage #3, the message of the first barrier synchronization retained at the point of time because of the communication delay is destroyed by the new arrived message of the second barrier synchronization. In other words, on the process #3, the reception state that the message of the first barrier synchronization has been received is overwritten by the reception state that the message of the second barrier synchronization has been received.

The parallel computing system, the synchronization device, and the control method of the parallel computing system establish the barrier synchronization at a high speed while avoiding an overhead caused by the double introduction of barrier synchronization and preventing or inhibiting the waiting state of the message of the barrier synchronization from being destroyed.

Figure 1:
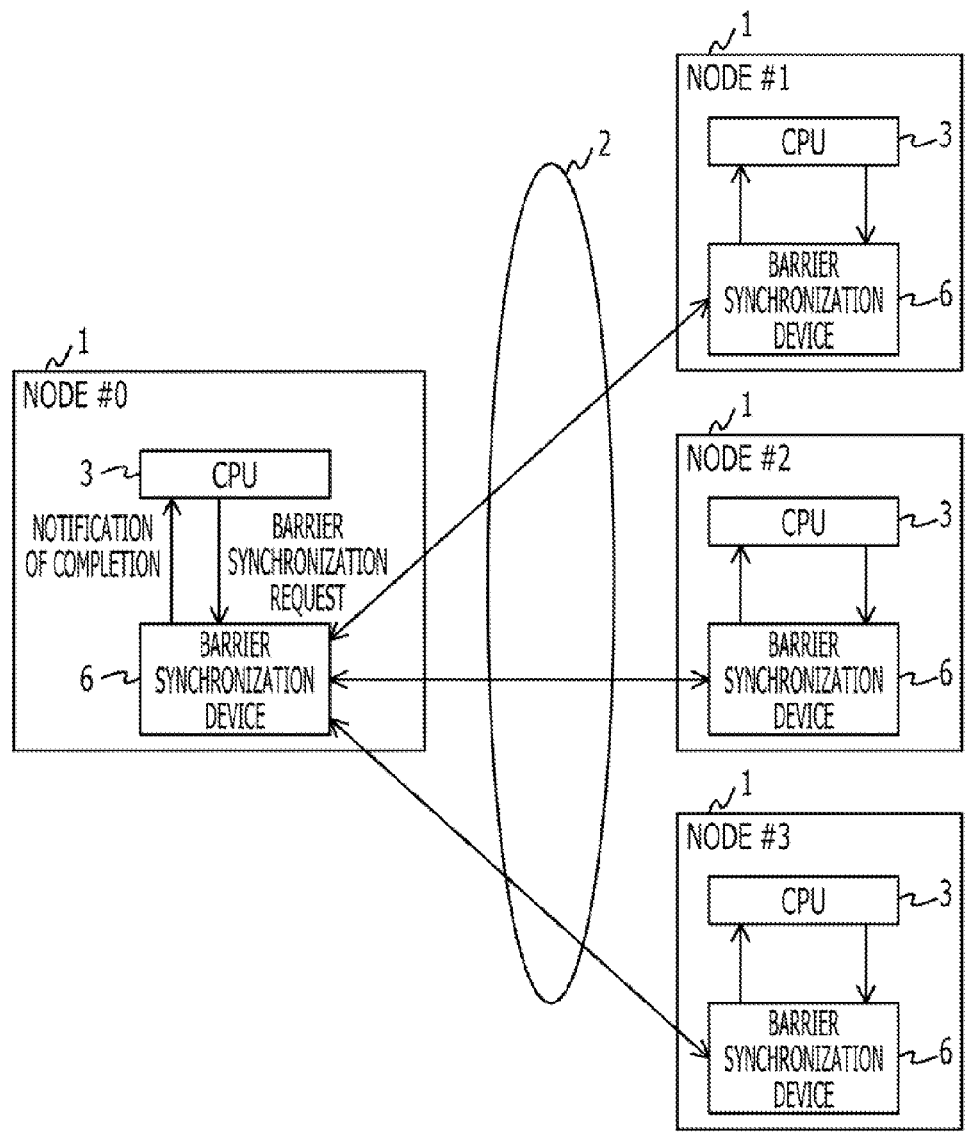
FIG. 1 illustrates a configuration of a parallel computing system.

FIG. 1 illustrates a configuration of the parallel computing system, such as a computer network including a plurality of nodes, each node including the barrier synchronization device.

The parallel computing system includes a plurality of computers 1, i.e., nodes 1, and a network 2 connecting the nodes. As illustrated in FIG. 1, the four nodes #0-#3 are included in the parallel computing system. The plurality of nodes 1 are interconnected to each other via the network 2 as an interconnecting network. The plurality of nodes 1 interconnected via the network 2 perform parallel computing. Each of the nodes 1 includes a barrier synchronization device 6 for establishing barrier synchronization in the parallel computing. In other words, the parallel computing system includes a plurality of barrier synchronization devices 6. The barrier synchronization device 6 performs the barrier synchronization at a high speed.

In the parallel computing system of FIG. 1, the nodes 1 are mutually connected to each other. For example, the node #0 is connected to each of the node #1 through the node #3. As diagrammatically illustrated in FIG. 1, each node 1 includes central processing unit (CPU) 3 and barrier synchronization device 6.

Figure 2:
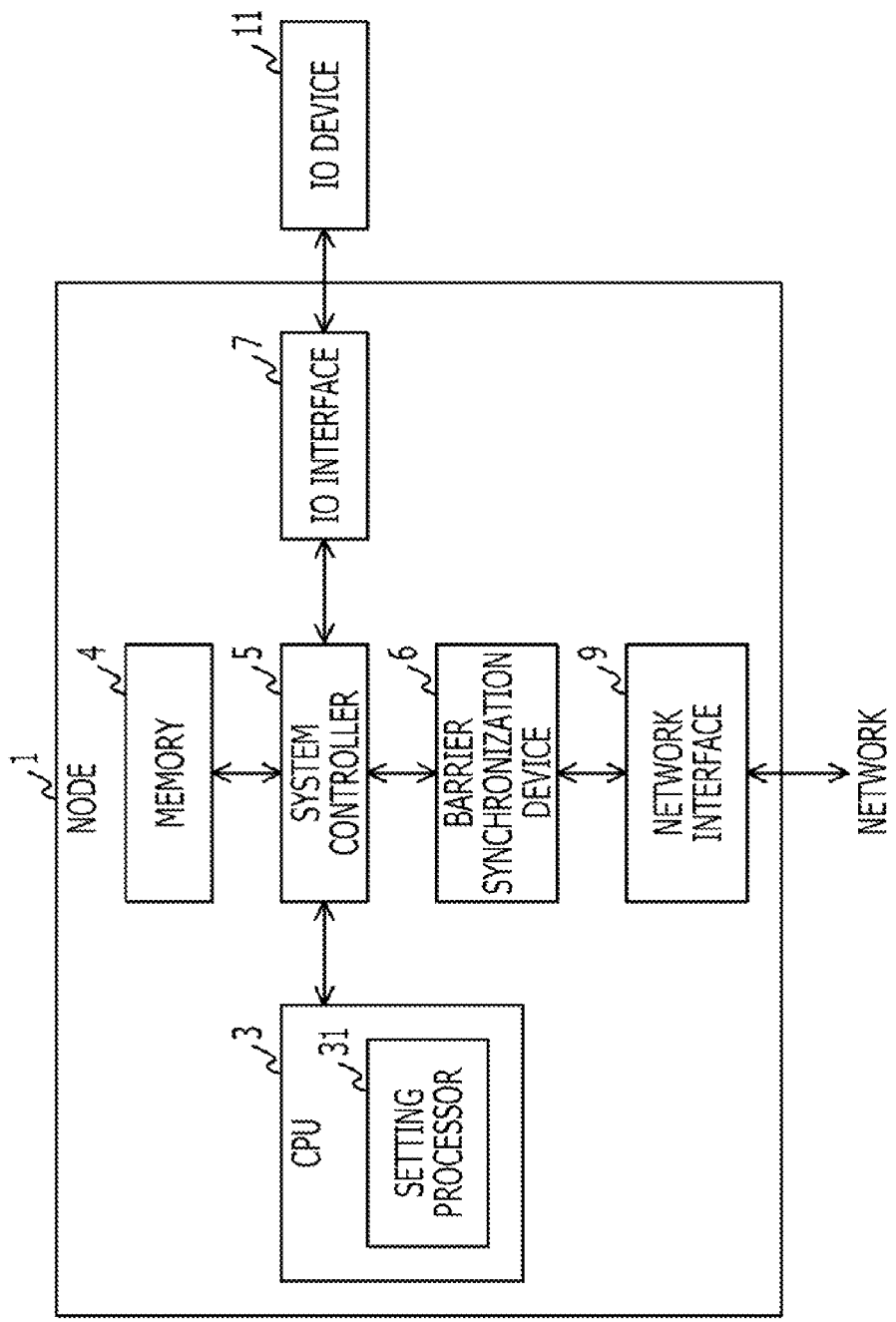
FIG. 2 illustrates a structure of a node including a barrier synchronization device.

FIG. 2 illustrates a structure of the node 1 including the barrier synchronization device 6 that establishes barrier synchronization through butterfly.

The node 1 includes CPU 3, memory 4, system controller 5, barrier synchronization device 6, IO (input-output) interface 7, and network interface 9. The system controller 5 controls the node 1. In other words, the system controller 5 controls CPU 3, memory 4, barrier synchronization device 6, and IO device 11. The CPU 3 includes a setting processor 31. The system controller 5 is connected to the IO device 11 via the IO interface 7. The system controller 5 may include the IO interface 7. The barrier synchronization device 6 is connected to the network 2 via the network interface 9. The barrier synchronization device 6 may include the network interface 9.

The setting processor 31 exchanges data with the IO device 11 via the system controller 5 and the IO interface 7. The IO device 11 enters, to the setting processor 31 in the CPU 3, the setting condition including the algorithm of the barrier synchronization and the execution condition. The IO device 11 outputs the data output from the setting processor 31 as appropriate.

The setting processor 31 transmits the message of the barrier point arrival to the barrier synchronization device 6 via the system controller 5. The setting processor 31 receives the message of the established barrier synchronization from the barrier synchronization device 6. In accordance with the setting condition input via the IO device 11, the setting processor 31 sets in the barrier synchronization device 6 the transmission destinations of the first barrier synchronization message, and the transmission destination of the second barrier synchronization message. In accordance with the setting condition, the barrier synchronization device 6 communicates with the barrier synchronization device 6 of another node 1 via the network 2 and the network interface 9, and establishes the barrier synchronization via communications.

The barrier synchronization device 6 executes the barrier synchronization through the butterfly. In other words, the barrier synchronization device 6 establishes the barrier synchronization by waiting for incoming data, and transmits data when the awaited data is ready. More specifically, out of the barrier synchronization devices 6 in the parallel computing system of FIG. 1, synchronization is established among a plurality of barrier synchronization devices 6 belonging to a first group. After synchronization is established among the plurality of barrier synchronization devices 6 belonging to the first group, synchronization is to be performed on a plurality of barrier synchronization devices 6 belonging to a second group different from the first group.

The setting processor 31 exchanges data with the memory 4 via the system controller 5. The setting processor 31 in this way writes data on the memory 4 and reads data from the memory 4. The data may be used in a reduction calculation to be discussed later.

Figure 3:
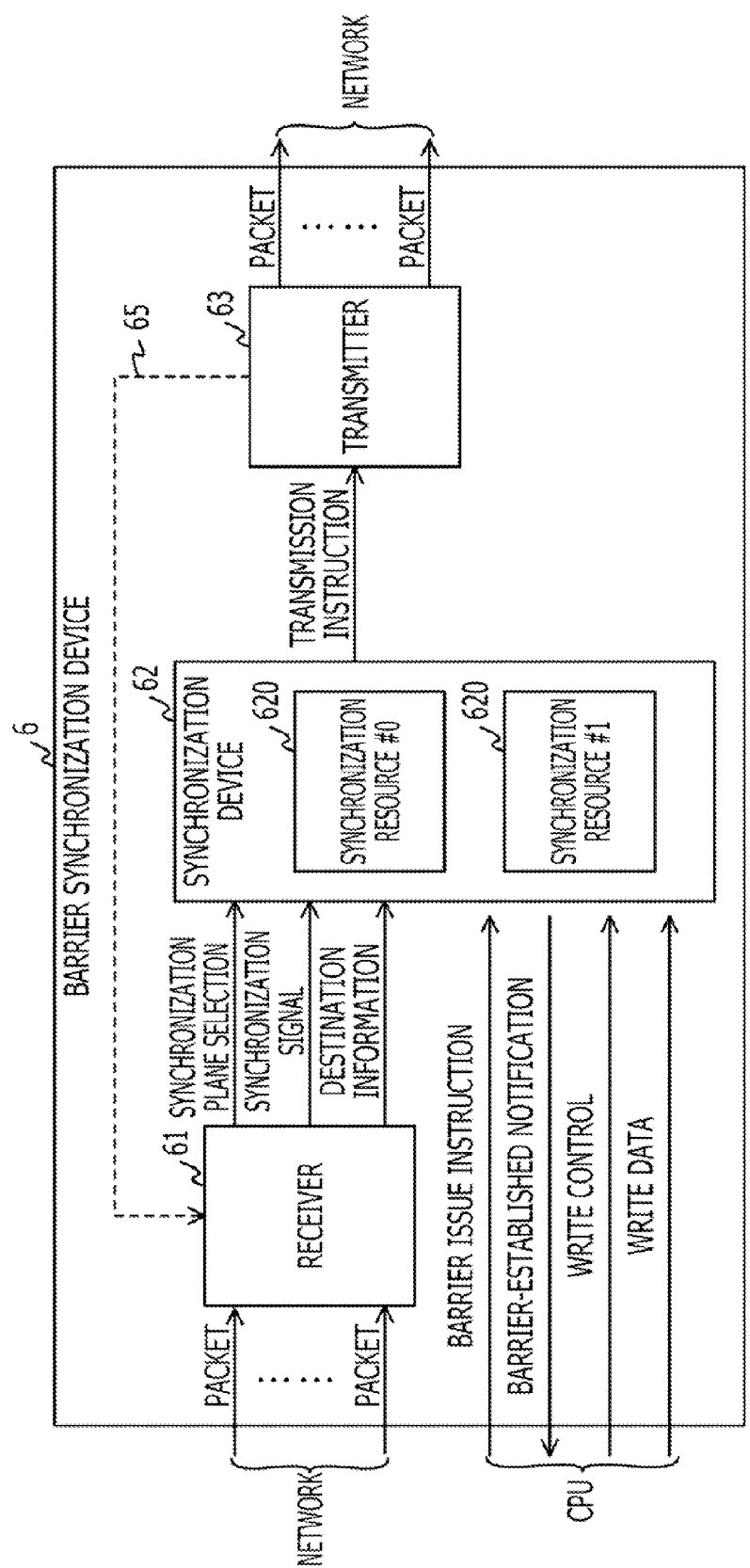
FIG. 3 illustrates a structure of the barrier synchronization device.
Figure 4:
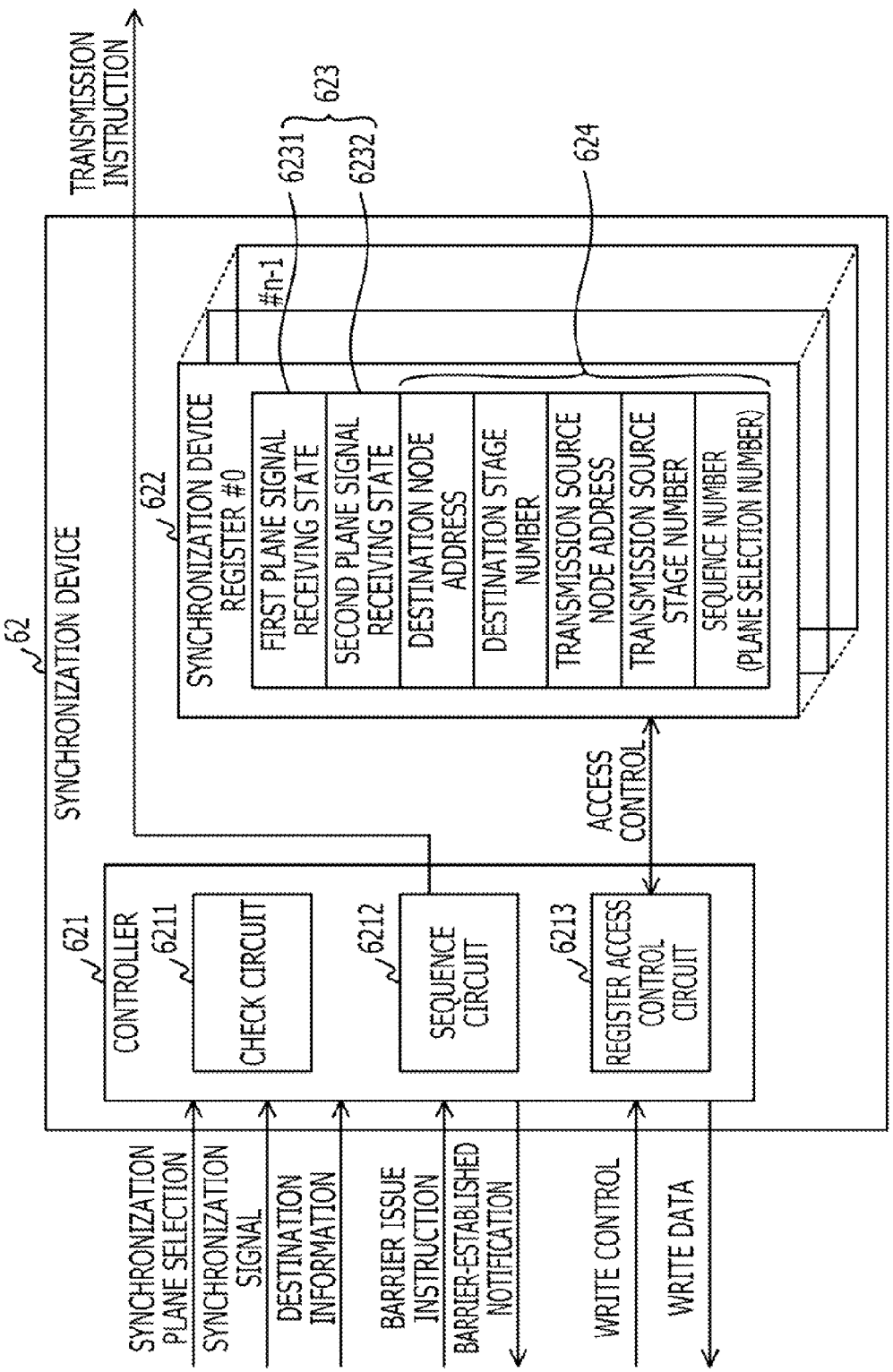
FIG. 4 illustrates a structure of a synchronization device (synchronizer)

FIG. 3 illustrates the structure of the barrier synchronization device 6. FIG. 4 illustrates a synchronization device (synchronizer) 62 included in the barrier synchronization device 6 of FIG. 3.

The barrier synchronization device 6 includes receiver 61, synchronization device 62, transmitter 63, and loop path 65. The parallel computing system thus includes a plurality of synchronization devices 62. The synchronization device 62 is a major portion of the barrier synchronization device 6. To differentiate the two elements, the synchronization device 62 is hereinafter referred to as a "synchronizer 62."

The synchronizer 62 includes two synchronization resources 620 as illustrated in FIG. 3. The two synchronization resources 620 are two signal receiving state registers 623 as described below. Each of the two signal receiving state registers 623 includes a first plane signal receiving state register 6231 and a second plane signal receiving state register 6232. The signal receiving state register 623 is arranged in each of a plurality of synchronization device registers 622. For example, the synchronization resource #0 is the first plane signal receiving state register 6231, and the synchronization resource #1 is the second plane signal receiving state register 6232.

FIG. 3 diagrammatically indicates that the synchronizer 62 includes two synchronization resources 620. As illustrated in FIG. 4, the two synchronization resources 620 are two registers in practice arranged in each of a plurality of synchronization device registers 622.

The synchronizer 62 includes the controller 621, and the synchronization device registers 622. The controller 621 includes check circuit 6211, sequence circuit 6212, and register access control circuit 6213. The synchronization device registers 622 are a plurality of registers included in a register group. In the discussion that follows, the synchronization device register 622 is also referred to as a "register 622."

The synchronization device registers 622 of n are arranged for n synchronization message groups #0-#n−1, respectively. In other words, a single register 622 corresponds to a single stage of one process. With a plurality of registers 622, each register 622 stores the synchronization message on a per calculation basis, and the barrier synchronization is performed. When one set of calculations is composed of the first synchronization messages of n, the synchronizer 62 performs the barrier synchronization on each of a plurality of sets, each set composed of the first synchronization message of n. In this case, a plurality of processes are executed on a single node 1.

With reference to FIG. 2, a plurality of processes are executed on a single node 1, a set of calculations is executed, and the barrier synchronization is established on the set of calculations. With reference to FIG. 2, a single process may be executed on a single node 1 instead of an embodiment in which a plurality of processes are executed on a single node 1. In such a case, the process is substantially equal to the node 1.

As illustrated in FIG. 2, each of the registers 622 of FIG. 4 includes two signal receiving state registers 623, and a single setting information register 624. In practice, the setting information register 624 is a register group including a plurality of registers. In the discussion that follows, the signal receiving state registers 623 is referred to as a "receiving state register 623."

The receiving state register 623 includes two registers, i.e., the first plane signal receiving state register 6231 and the second plane signal receiving state register 6232. The receiving state register 623 is the synchronization resource 620 used for synchronization. Since the receiving state register 623 includes the two registers, the two synchronization resources 620 of two planes are arranged on each stage of one process. With the two synchronization resources 620 of two planes, the waiting state of the message of the barrier synchronization, i.e., synchronization information is prevented or inhibited from being destroyed and the barrier synchronization is performed at a high speed.

The first plane signal receiving state register 6231 is the first synchronization resource 620, and is a first receiving state register retaining the synchronization information from at least two barrier synchronization devices 6 establishing the barrier synchronization. The synchronization information is information indicating whether a synchronization message has been received from one of a process and a node, or information indicating the waiting state of the synchronization message. The second plane signal receiving state register 6232 is a second synchronization resource 620, and is a second receiving state register retaining the synchronization information based on the synchronization message from at least two barrier synchronization devices 6 establishing the barrier synchronization.

The controller 621 causes the first plane signal receiving state register 6231 and the second plane signal receiving state register 6232 to store the synchronization information extracted by the receiver 61 in an alternate fashion in accordance with register selection information. When one of the first plane signal receiving state register 6231 and the second plane signal receiving state register 6232 stores all the synchronization information based on the synchronization messages from at least two barrier synchronization devices 6 establishing synchronization, the controller 621 causes the transmitter 63 to transmit data to at least two barrier synchronization devices 6 establishing synchronization. In other words, when the synchronization information extracted from the data from at least two synchronization devices is ready in one of the first plane signal receiving state register 6231 and the second plane signal receiving state register 6232, the controller 621 causes the transmitter 63 to transmit the data including the register selection information. The register selection information causes the first plane signal receiving state register 6231 and the second plane signal receiving state register 6232 included in each of at least two synchronization devices to store the synchronization information.

The check circuit 6211 in the controller 621 performs a check operation on the consistency of the packets received by the processes. The check circuit 6211 receives from the receiver 61 synchronization plane selection information, synchronization information, and destination information, and performs the check operation on the consistency of the packets using these pieces of information. The check circuit 6211 inputs the check results of the consistency of the packets to the sequence circuit 6212.

The check circuit 6211 determines a sequence number of the received packet, and a sequence number of a process (in other words, a stage where the operation of the process proceeds) in accordance with the synchronization plane selection information, the synchronization message, and the destination information, and determines a difference between the two sequence numbers. The check circuit 6211 compares the resulting difference with the number of packets received in the process (in other words, the stage where the operation of the process proceeds). The check operation of the consistency of the packets is described below. When the check operation results of the packet consistency indicate that the sequence number is consistent with the number of packets, one of the two receiving state registers 623 is selected in accordance with the synchronization plane selection information.

The sequence circuit 6212 in the controller 621 outputs to the transmitter 63 the message of the barrier synchronization, i.e., a transmission instruction of the synchronization signal for the barrier synchronization. The transmitter 63 transmits the message of the barrier synchronization to another node 1. The sequence circuit 6212 receives a reference result that the register access control circuit 6213 has obtained by referencing the register 622, and a barrier issue instruction from the CPU 3. In response to these pieces of information, the sequence circuit 6212 outputs a transmission instruction of the message of the barrier synchronization to the transmitter 63, and transmits the barrier synchronization-established notification to the CPU 3.

The register access control circuit 6213 in the controller 621 sets the setting information on the setting information register 624 in the register 622. The setting information is input via the setting processor 31 in the CPU 3 as write data. The register 622 having the setting information stored thereon is specified by a write control signal including a write address input via the setting processor 31 in the CPU 3.

The register access control circuit 6213 in the controller 621 references the register 622, and the controller 621 transmits the synchronization message for the barrier synchronization in response to the reference results. In practice, the transmitter 63 performs the transmission of the synchronization signal in response to an instruction from the sequence circuit 6212. The two receiving state registers 623 in the register 622 respectively store information indicating whether the synchronization message has been received from one of the process and the node corresponding to the register 622. In other words, the two receiving state registers 623 store information indicating the waiting states of the synchronization messages, respectively. The setting information register 624 stores the setting information including information indicating one of the process and the node as a destination to which the register 622 transmits the synchronization message. In other words, the setting information register 624 stores information indicating the transmission destination of the synchronization message subsequent to the establishment of the synchronization.

The synchronization information indicates a state of synchronization determined in accordance with a synchronization signal included in the synchronization message, and stored in the two receiving state registers 623. The synchronization signal included in the synchronization message is included in the message of the barrier synchronization. As is described below with reference to FIG. 5, the synchronization signal includes type, destination node address, transmission source node address, transmission source stage number, destination stage number, and sequence number. The synchronization signal is transmitted and received in the form thereof included in the message of the barrier synchronization. The transmission and reception of the synchronization signal mean the transmission and reception of the message of the barrier synchronization including the synchronization signal. The synchronization signal included in the message of the barrier synchronization is extracted from the message of the barrier synchronization.

The setting information register 624 stores the setting information. More specifically, the setting information register 624 stores the setting information including the "destination node address," the "destination stage number," the "transmission source node address," the "transmission source stage number," the "sequence number" (in other words, a plane selection number). The sequence number is register selection information for selecting one of the two receiving state registers 623. The destination node address is described with reference to FIG. 5. By specifying the setting information, one register 622 is determined in one node.

If the transmission destination of the synchronization signal is own node 1, the setting information register 624 stores the setting information specifying the register 622 in the synchronizer 62 of own process or own node 1.

Prior to the execution of the barrier synchronization, the setting information is input to the setting processor 31 via the IO device 11. In the setting condition, the algorithm of the barrier synchronization is an algorithm through butterfly calculation, and the execution condition is four processes. Further input as the execution condition are the number of stages k in calculation or in the barrier synchronization, and a process number i of each process or own node 1. The number of stages k is a maximum number of the stage number.

The inputting of the setting information to the setting processor 31 is not limited to this method. For example, any single node 1 may input each setting condition to another node 1 via the network 2. Alternatively, a management computer connected to the network 2 may input each setting condition to all the nodes 1 via the network 2.

Prior to the execution of the barrier synchronization, the setting processor 31 in the CPU 3 sets the setting information responsive to the setting condition on the register 622 via the controller 621. As described above, the setting condition includes the algorithm of the barrier synchronization and the execution condition.

Subsequent to the setting, the setting processor 31 transfers a barrier synchronization start signal to the controller 621, thereby starting the barrier synchronization. When the barrier synchronization is established at the final stage of the process, the synchronizer 62 transfers to the setting processor 31 a barrier synchronization-established signal, e.g., a signal indicative of the completion of the barrier synchronization.

The receiver 61 is connected to another node 1 via the network interface 9 and the network 2. The receiver 61 receives packets from at least two barrier synchronization devices 6 establishing synchronization out of the plurality of barrier synchronization devices 6 in the parallel computing system, and then extracts the synchronization information and the register selection information from the packets from at least two barrier synchronization devices 6 establishing synchronization. At least two barrier synchronization devices 6 establishing synchronization include the barrier synchronization device 6 of own node 1. The receiver 61 may receive packets from at least two barrier synchronization devices 6 establishing synchronization including own node 1, out of the plurality of barrier synchronization devices 6.

More specifically, the receiver 61 receives packets for the barrier synchronization, e.g., data for the barrier synchronization from another node 1 or own node 1. The receiver 61 receives a first synchronization signal having the transmission destination set therewithin, in accordance with the setting condition including the algorithm of the barrier synchronization and the execution condition, and transfers the first synchronization signal to the synchronizer 62. The receiver 61 receives a packet for the barrier synchronization from the barrier synchronization device 6 in another node 1 via the network 2.

The receiver 61 also receives a packet for the barrier synchronization, e.g., the data for the barrier synchronization from the transmitter 63 in the barrier synchronization device 6 of own node 1. In this case, the packet for the barrier synchronization is transmitted and received via the loop path 65 denoted by a broken line as illustrated in FIG. 3. The loop path 65 is arranged within own node 1 and connects the transmitter 63 to the receiver 61.

Upon receiving the packet, the receiver 61 generates the synchronization plane selection information, the synchronization signal, and the destination information in accordance with the received packet, and then transfers the generated information to the synchronizer 62. More specifically, the receiver 61 extracts the synchronization plane selection information, the synchronization signal, and the destination information from the received packet, and transfers the extracted information to the synchronizer 62. The synchronization plane selection information, the synchronization signal, and the destination information are described below with reference to FIG. 5.

A plurality of nodes as transmission sources may be present, and the receivers 61 may include the network interfaces 9 of the number corresponding to the number of nodes 1 as the transmission sources. A plurality of receivers 61 may be used to concurrently receive the packets transmitted from a plurality of nodes. The same may be true of the transmitter 63.

FIG. 5 illustrates a format of the packet.

The packets transmitted and received during the process #0 through the process #3 have the format of FIG. 5, for example. The packet includes header cyclic redundancy check (CRC), routing header, type, destination node address, transmission source node address, transmission source stage number, destination stage number, sequence number, and packet CRC. The synchronization plane selection information is part of the sequence number. The synchronization signal included in the packet includes type, the destination node address, the transmission source node address, the transmission source stage number, the destination stage number, and the sequence number. The destination information includes the destination node address, and the destination stage number.

The header CRC is an error detection code for the routing header.

The routing header is information according to which a router determines a next destination in the transmission of a packet. The router is a relay device included in the network interface executing a packet transfer in the network 2.

The type indicates the type of a packet. In other words, the type indicates a barrier. For example, the type indicates that the packet is a message of the barrier synchronization.

The destination node address indicates the address of a destination node 1 of the packet over the network 2. When a barrier packet is transmitted at each stage, the barrier synchronization device embeds into the packet the destination node address preset in setting information register of the barrier synchronization device.

The transmission source node address indicates an address of the transmission source node 1 of the packet over the network 2. When a barrier packet is transmitted at each stage, the barrier synchronization device embeds own node address into the packet. The controller of the barrier synchronization device having received the packet compares a value at a field of the transmission source node address with the transmission source node address preset in the setting information register of the barrier synchronization device. The comparison results are used to determine whether to receive the packet or not.

The transmission source stage number is a stage number of the barrier synchronization device as the packet transmission source node 1. When a barrier packet is transmitted at each stage, the barrier synchronization device embeds the stage number as the transmission source stage number into the packet. The controller of the barrier synchronization device having received the packet compares a value at a field of the transmission source stage number with the transmission source stage number preset in the setting information register of the barrier synchronization device. The comparison results are used to determine whether to receive the packet or not.

The transmission destination stage number is a stage number of the barrier synchronization device as the packet transmission destination node. When the barrier synchronization device transmits a barrier packet corresponding to the barrier synchronization message at each stage, the barrier synchronization device embeds into the packet the destination stage number preset in the setting information register of the barrier synchronization device. The controller of the barrier synchronization device having received the packet references a value at a field of the transmission destination stage number, and uses the value to select the setting information register (for stage selection).

The sequence number is added to the barrier packet corresponding to the barrier synchronization message when the barrier synchronization device transmits the barrier packet at each stage. Part of the sequence number is used as the synchronization plane selection information as illustrated in FIG. 6.

The packet CRC is an error correction code for the entire packet.

FIG. 6 illustrates the synchronization plane selection information.

The synchronization plane selection information is included in the sequence number. In other words, the least significant bit of the sequence number is used as the synchronization plane selection information. More specifically, when the packet is the barrier synchronization message with the least significant bit of the sequence number being "0," the packet is the synchronization signal. In other words, the message of the barrier synchronization is a synchronization signal addressed to the first plane signal receiving state register 6231. When the packet is the barrier synchronization message with the least significant bit of the sequence number being "1," the packet is the synchronization signal. In other words, the barrier synchronization message is a synchronization signal addressed to the second plane signal receiving state register 6232.

As illustrated in FIGS. 3 and 4, the synchronizer 62 performs the operation of the barrier synchronization in accordance with the synchronization plane selection information, the synchronization signal, and the destination information from the receiver 61. To this end, the synchronizer 62 awaits a plurality of barrier synchronization messages. After synchronization is established in each group, the barrier synchronization message as the synchronization signal is transmitted to the transmission destination specified by the destination information. In the algorithm of the barrier synchronization, a process of modifying the transmission destination of the barrier point is performed at a high speed on a per stage basis. Unique setting information is assigned to each of the groups of the messages of the barrier synchronization. The synchronizer 62 receives from the receiver 61 the message of the barrier synchronization as the synchronization signal and the setting information, and then outputs to the transmitter 63 the message of the barrier synchronization of the group with synchronization established.

The synchronizer 62 synchronizes the n number of the first synchronization messages preset in accordance with the setting condition (n being a positive integer) for each of the groups of the messages of the barrier synchronization. When the n number of the barrier synchronization messages are input, synchronization is established. Subsequent to the establishment of synchronization, the synchronizer 62 instructs the transmitter 63 to transmit the message of the second barrier synchronization. The number of messages of the second barrier synchronization is m (m being a positive integer), and the transmission destination of the message is preset in accordance with the setting condition.

If the synchronization is established, the synchronizer 62 transmits the message of the barrier synchronization to the preset transmission destination in each group. The transmission destination is the synchronizer 62 of another node 1 or the synchronizer 62 of own node 1. When the transmission destination of the message of the barrier synchronization is the other node 1, the setting information including the destination node address of the transmission destination node 1 is preset in the synchronizer 62. The synchronizer 62 transfers a signal of a packet transmission instruction to the transmitter 63. Upon receiving the packet transmission instruction from the synchronizer 62, the transmitter 63 transmits the packet for the barrier synchronization via the network 2 to the barrier synchronization device 6 of the other node 1 specified by the destination node address. When the transmission destination of the message of the barrier synchronization is own node, the setting information is preset in the synchronizer 62. The synchronizer 62 transfers the message of the barrier synchronization to the register 622 specified in the synchronizer 62 in own process or own node 1.

Upon receiving a barrier synchronization start signal from the setting processor 31 in the CPU 3, the synchronizer 62 transmits the message of the barrier synchronization to the specified transmission destination. When the barrier synchronization is established at the final group of the message of the barrier synchronization, the synchronizer 62 notifies the setting processor 31 in the CPU 3 of a barrier synchronization-complete signal.

The transmitter 63 is connected to the other node 1 via the network 2 and the network interface 9. The transmitter 63 transmits the data to at least two barrier synchronization devices 6 establishing synchronization out of the plurality of barrier synchronization devices 6 in the parallel computing system. The barrier synchronization device 6 of own node 1 is included in at least two barrier synchronization devices 6 establishing synchronization. The transmitter 63 may thus transmit the data to at least two barrier synchronization devices 6 establishing synchronization including own node 1, out of the plurality of barrier synchronization devices 6.

More specifically, the transmitter 63 transmits to the other node 1 or own node 1 the packet for the barrier synchronization, e.g., the data for the barrier synchronization. When the transmitter 63 transmits a first barrier synchronization message having the transmission destination preset in accordance with setting condition including the algorithm of the barrier synchronization and the execution condition, the transmitter 63 also transfers to the synchronizer 62 the first barrier synchronization message. The transmitter 63 transmits the packet for the barrier synchronization to the barrier synchronization device 6 of the other node 1 via the network 2.

The transmitter 63 also transmits to the receiver 61 of the barrier synchronization device 6 of own node 1 the packet for the barrier synchronization, e.g., the data for the barrier synchronization. The packet for the barrier synchronization is transmitted and received via the loop path 65 denoted by the broken line in FIG. 3 as described above. The transmitter 63 supplies the data to own node 1 via the loop path 65.

Upon receiving a transmission instruction from the synchronizer 62, the transmitter 63 transmits the message of the second barrier synchronization to the preset m transmission destinations. The transmitter 63 receives a signal of the packet transmission instruction from the synchronizer 62, generates the packet in accordance with the specified transmission destination, and transmits the packet to the other node 1 via the network 2. As described above, the node 1 serving as the transmission destination is determined in accordance with the setting information.

Figure 7:
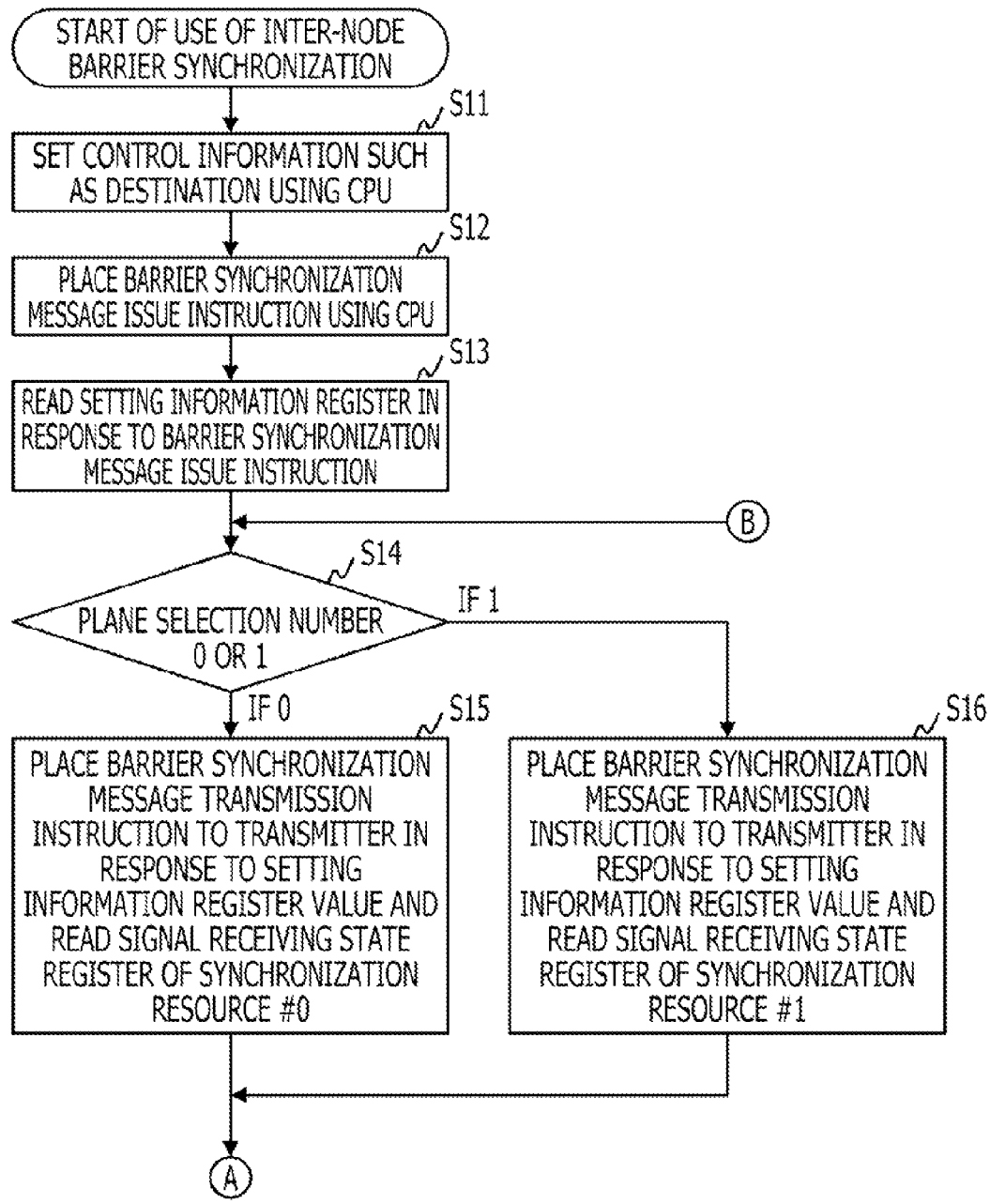
FIG. 7 is a process flowchart of a barrier synchronization process.
Figure 8:
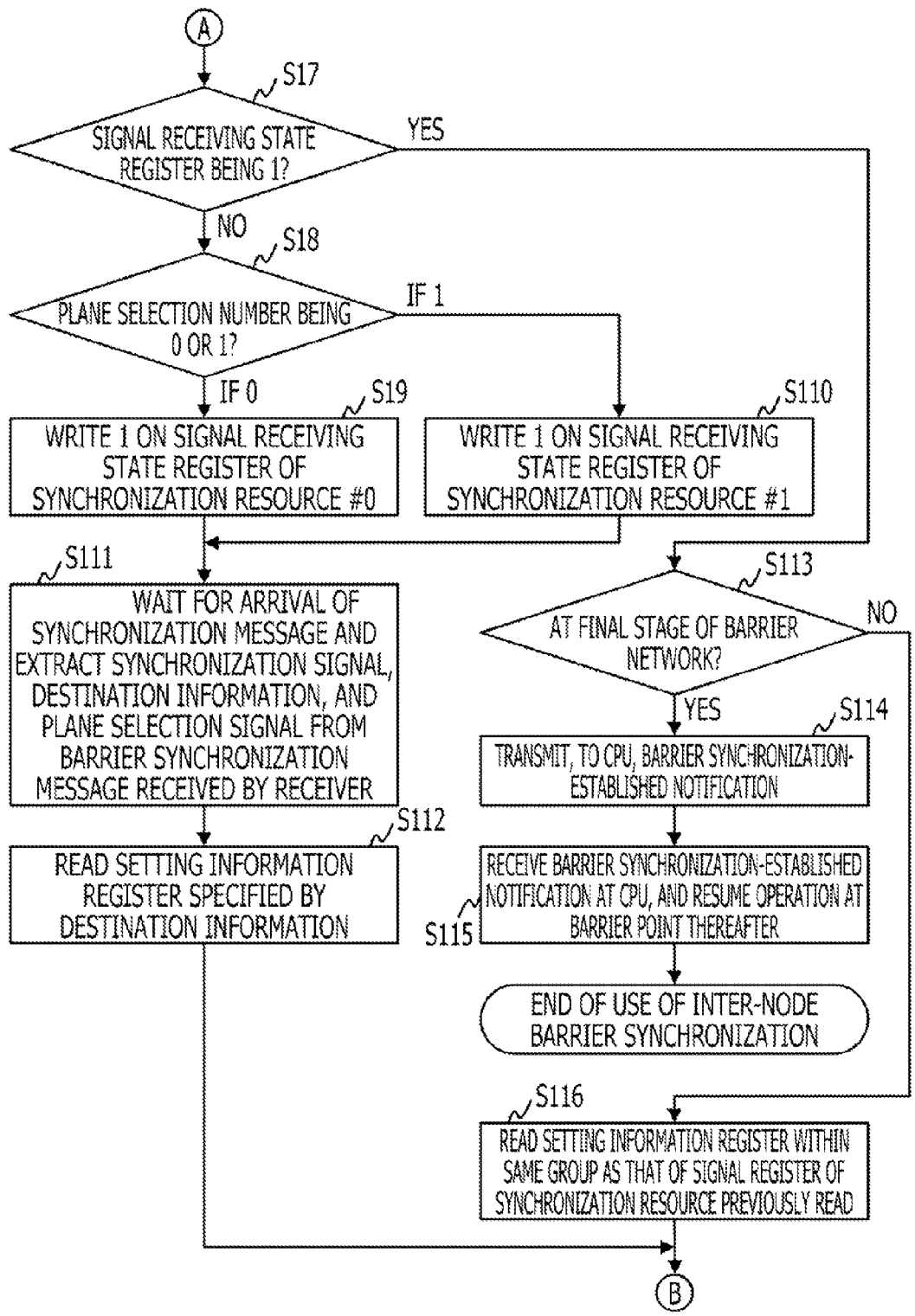
FIG. 8 is a continuation of the process flowchart of FIG. 7.

FIGS. 7 and 8 are flowcharts of the barrier synchronization process through butterfly performed by the parallel computing system including the barrier synchronization device 6 of FIGS. 1-3.

Prior to the start of the barrier synchronization, the setting processor 31 set in the CPU 3 determines the assignment of the register 622 in accordance with the algorithm of the barrier synchronization and the setting condition, and sets the setting information corresponding to the next stage through butterfly on the setting information register 624 of each register 622 (S11).

The setting processor 31 inputs information as a write address, indicating the register 622 as a setting target of the setting information, to the synchronizer 62. Also the setting processor 31 inputs, as write data, the setting information to be set on the setting information register 624 of the register 622, to the controller 621 of the synchronizer 62. The write address and the write data are input for each of the registers 622. In response, the controller 621 stores the setting information as the input write data on the setting information register 624 of the register 622 specified by the write address. The storage of the write data is performed by the controller 621 that receives the write address and the write data from the setting processor 31. Separately from this operation, the initial value, for example, "0" may be set in the two receiving state registers 623.

The setting of the setting value is performed as described below. When the number of nodes is power of 2, the message of the barrier synchronization is transmitted at the next stage of one own process and own node 1 and at the next stage of the other node 1 through the butterfly after the establishment of synchronization. The destination information specified in the setting information register 624 may be the setting information of own process or own node 1 or the setting information of the other node 1.

Since no signal waiting is performed at the first stage, the receiving state register 623 is not used. At the final stage, on the other hand, the setting information register 624 is not used. The register at the first stage and the register at the final stage are not used at the same time. The same register 622 may be specified for the first stage and for the final stage. For example, as illustrated in FIGS. 15A-15C through 26A-26C, the same setting information register 624 is specified at the first stage and at the final stage.

The same register may not be commonly used at the first stage and the final stage. For example, different registers 622 may be specified at the first stage and at the final stage. When the number of registers 622 is large, the setting information register 624 at the first stage may be different from the setting information register 624 at the final stage.

If the number of nodes is not a power of 2, a node is added to the network 2. The register 622 of the added node may be arranged in another node 1. For example, the barrier synchronization is to be established among three nodes #1-#3, the register 622 of the node 1 may be arranged in any of the nodes #1-#3. In this case, the register 622 corresponds to the intermediate stage. The register 622 corresponding to the intermediate stage is arranged at one of the nodes #1-#3. At the first stage, the value of the receiving state register 623 at the transmission destination of the register 622 is preset to "1." At the final stage, the register 622 at the first stage is excluded from the setting information register 624 of the transmission source of the register 622.

If the process reaches the barrier point, the CPU 3 transmits, to the synchronizer 62 in the barrier synchronization device 6, a barrier synchronization start signal, in other words, the message of the barrier synchronization including the synchronization signal (S12). The barrier synchronization start signal is the message of the barrier synchronization including the synchronization signal, e.g., a barrier synchronization issue instruction. The barrier synchronization start signal includes a number of the register 622 corresponding to the first stage. The barrier synchronization start signal of a given node 1 thus specifies a given register 622. Since no packet is received from another process at the first stage, the receiver 61 does not supply the synchronization signal and the destination information to the controller 621.

Upon receiving the barrier synchronization start signal, the controller 621 in the synchronizer 62 reads the value at the setting information register 624 of the register 622 corresponding to the number specified by the barrier synchronization start signal (S13). To read the value, the controller 621 uses as the read address the setting information specified by the barrier synchronization start signal and then reads as the data at the address on the value at the setting information register 624 of the register 622. The receiving state register 623 in the register 622 corresponding to the first stage is not used, and thus does not await the message of the barrier synchronization. The value at the setting information register 624 of one register 622 in a given node 1 is substantially equal to the value at the setting information register 624 of one register 622 in a node #2 as another node 1, and the value at the setting information register 624 of one register 622 in a node #1 as own node 1.

The controller 621 reads the least significant bit of the sequence number of the barrier synchronization start signal, e.g., the synchronization plane selection information, and determines whether the value of the read synchronization plane selection information is "0" or "1" (S14).

If the value of the synchronization plane selection information is "0," the controller 621 outputs a packet transmission instruction to the transmitter 63 in response to the value specifying the register 622 of the other node 1 within the value of the setting information register 624 (S15). The packet transmission instruction includes the value of the setting information register 624 specifying the other node 1. The transmitter 63 generates the packet in response to the setting information including the destination node address specified by the packet transmission instruction from the controller 621. The transmitter 63 transmits the packet to the network 2. The destination of the packet is the specified destination node address. The packet is thus transmitted from one node 1 to the other node 1 with one register 622 in the other node 1 as a destination.

The transmitter 63 transfers the packet via the loop path 65 in accordance with the value specifying the register 622 of own node 1 within the value of the setting information register 624. Upon receiving the packet, the receiver 61 extracts the setting information becoming the synchronization plane selection information, the synchronization signal, and the destination information from the received packet, and transfers the extracted information to the controller 621 in the synchronizer 62. The controller 621 reads the value at the receiving state register 623 of the synchronization resource #0 of the specified register 622 (S15). More specifically, the controller 621 reads the value at the first plane signal receiving state register 6231 corresponding to the value "0" of the synchronization plane selection information.

If the value of the synchronization plane selection information is "1," the controller 621 outputs a signal of a packet transmission instruction to the transmitter 63 in accordance with the value specifying the register 622 of the other node 1 within the value of the setting information register 624 (S16). In response to the setting information including the destination node address specified by the packet transmission instruction from the controller 621, the transmitter 63 generates the packet, and then transmits the generated packet to the network 2.

The transmitter 63 transfers the packet via the loop path 65 to the receiver 61 in response to the value specifying the register 622 of own node 1 within the value of the setting information register 624. Upon receiving the packet, the receiver 61 extracts the setting information becoming the synchronization plane selection information, the synchronization signal, and the destination information from the received packet, and transfers the extracted information to the controller 621 in the synchronizer 62. The controller 621 reads the value at the receiving state register 623 of the synchronization resource #1 of the specified register 622 (S16). More specifically, the controller 621 reads the value at the second plane signal receiving state register 6232 corresponding to the value "1" of the synchronization plane selection information.

The synchronizer 62 determines whether "1" indicating the synchronization state is set in the receiving state register 623 of the next stage (S17). When "1" is set in the receiving state register 623 (yes from S17), synchronization is established. When "1" is not set in the receiving state register 623 (no loop from S17), no synchronization is established.

If no synchronization is established (no from S17), the controller 621 reads the least significant bit of the sequence number of the barrier synchronization start signal, e.g., the synchronization plane selection information, and determines whether the value of the read synchronization plane selection information is "0" or "1" (S18).

If the value of the synchronization plane selection information is "0," the controller 621 writes "1" on the first plane signal receiving state register 6231 as the synchronization resource #0 at the register 622 of the next stage specified by the setting information register 624 (S19). When the value of the synchronization plane selection information is "1," the controller 621 writes "1" on the second plane signal receiving state register 6232 as the synchronization resource #1 at the register 622 of the next stage specified by the setting information register 624 (S110).

In S19 and S110, the controller 621 writes "1" as the write data on the receiving state register 623 of the register 622 at the write address specifying own node 1 within the read value of the setting information register 624. In the node 1, one of the two receiving state registers 623 of one register 622 is "1." It is thus indicated that one of the messages of the barrier synchronization to be awaited has been received.

The synchronizer 62 awaits the reception of the packets, and the receiver 61 receives the packets. The receiver 61 extracts the setting information becoming the synchronization plane selection information, the synchronization signal, and the destination information in accordance with the received packet, and transfers the extracted information to the synchronizer 62 (S111).

Upon receiving the signal from the receiver 61, the controller 621 in the synchronizer 62 reads the value at the setting information register 624 of the specified register 622 (S112). Processing returns to S14. In S112, the controller 621 uses the specified setting information as the read address and reads as the data the value at the read address on the setting information register 624 of the register 622.

If "1" is set in the receiving state register 623 in S17, in other words, when the synchronization has been established (yes from S17), the controller 621 determines whether the register 622 corresponds to the final stage (S113). Subsequent to S19 or S110, the value of one of the two receiving state registers 623 is "1" in one node 1. When S17 is performed subsequent to S19 or S110, the synchronization is established.

When the synchronization is established in the register 622 corresponding to the final stage (yes from S113), the controller 621 transfers a signal of the barrier synchronization-established to the CPU 3 (S114). The CPU 3 receives the barrier synchronization-established signal from the controller 621 and learns that the barrier synchronization has been established (S115).

If it is determined in S113 that the register 622 does not correspond to the final stage (no loop from S113), the controller 621 reads the value at the setting information register 624 of the register 622 of the receiving state register 623 read in S17 (S116). Processing returns to S14.

The parallel computing apparatus may include a reduction calculation device that performs a reduction calculation while also performing the barrier synchronization through butterfly. Such a parallel computing apparatus is described below.

Figure 31A:
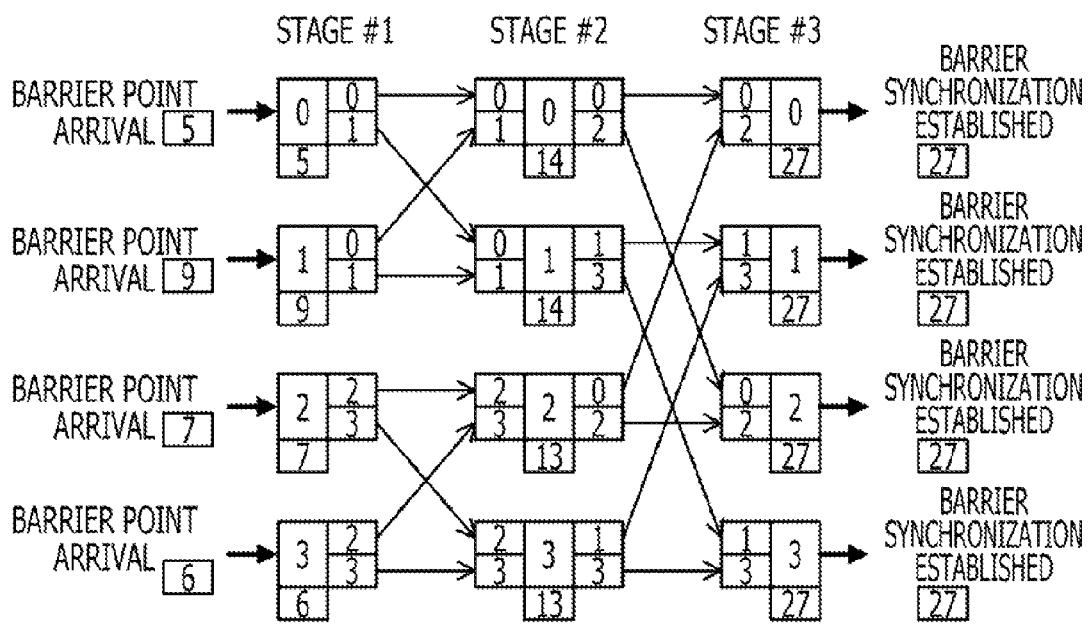
FIGS. 31A and 31B generally illustrate the reduction calculation.

The reduction calculation is briefly described with reference to FIGS. 31A and 31B. The reduction calculation is performed using the butterfly barrier synchronization as illustrated in FIG. 28A. FIG. 31A illustrates substantially the same process flow as that of FIG. 28A in principle. In other words, FIG. 31A illustrates an example in which the reduction calculation is performed among the four processes #0-#3 using the butterfly barrier synchronization.

Figure 31B:
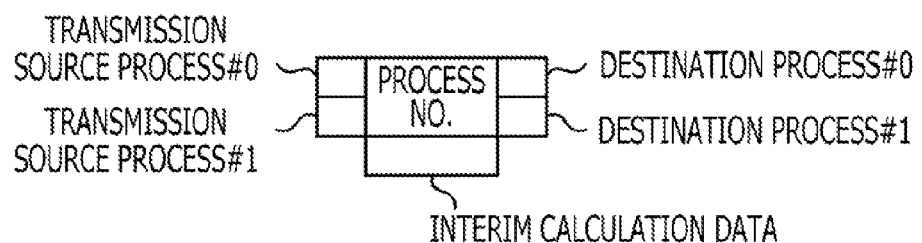

Each process of FIG. 31A is illustrated in detail in FIG. 31B. FIG. 31B has basically the same symbols as those in FIG. 28B, but is different from FIG. 28B in that interim calculation data of the reduction calculation is included. As illustrated in FIG. 31B, the interim calculation data is illustrated below the process number identifying own process in the center. Data at the barrier point arrival and data at the barrier synchronization establishment are also illustrated as the interim calculation data.

Each process arrives at the barrier synchronization point in the first stage #1. Each process then transmits the barrier point arrival signal and the interim calculation data to a process preset at the next stage over the butterfly network.

At the next stage #2, each process receives the barrier point arrival signal and the interim calculation data from the process preset at the prior stage #1. Each process then executes the reduction calculation using the received interim calculation data, and then transmits the barrier point arrival signal and the interim calculation data obtained through the reduction calculation to a process preset at the next stage #3.

At the final stage #3, each process awaits the barrier point arrival signal and the interim calculation data from the process preset at the prior stage #2. Upon receiving the barrier point arrival signal and the interim calculation data from another process, each process performs the reduction operation using the received interim calculation data. When all the processes #0-#3 arrive at the barrier points, the barrier synchronization is established, and the reduction calculation is complete.

The reduction calculation device 8 that performs the reduction calculation while performing the butterfly barrier synchronization is described.

Figure 9:
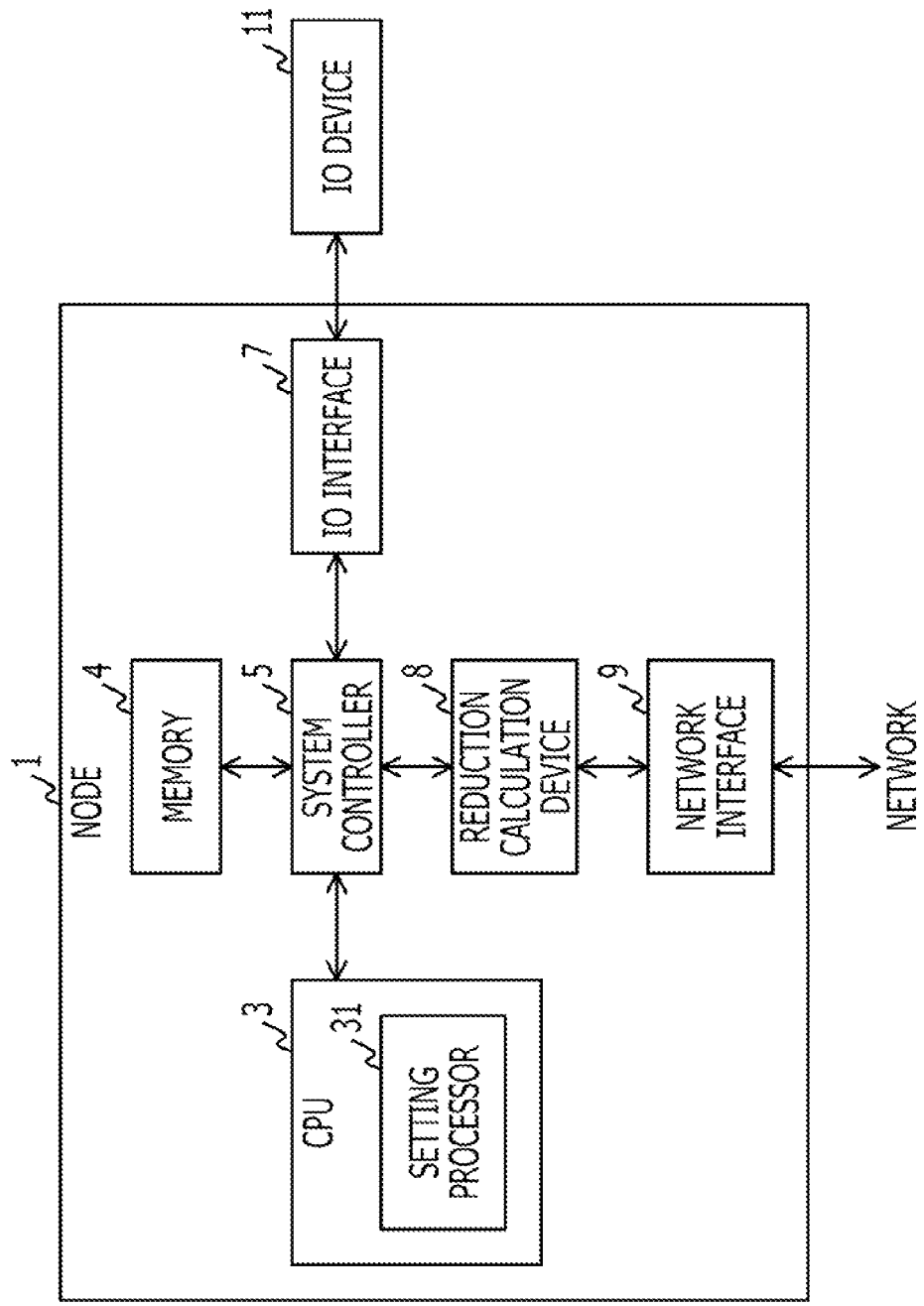
FIG. 9 illustrates a structure of a node including a reduction calculation device.
Figure 10:
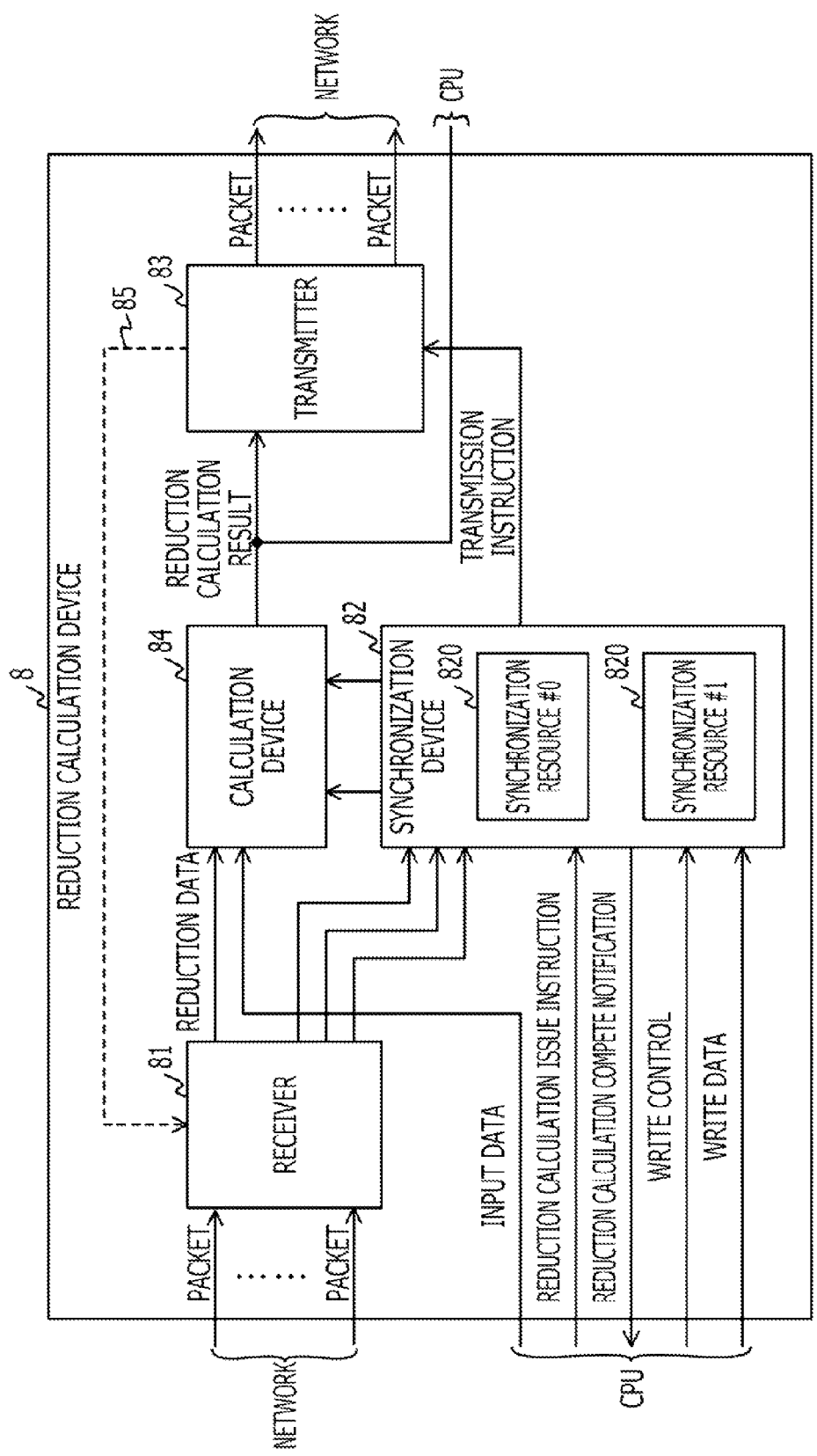
FIG. 10 illustrates a structure of the reduction calculation device.
Figure 11:
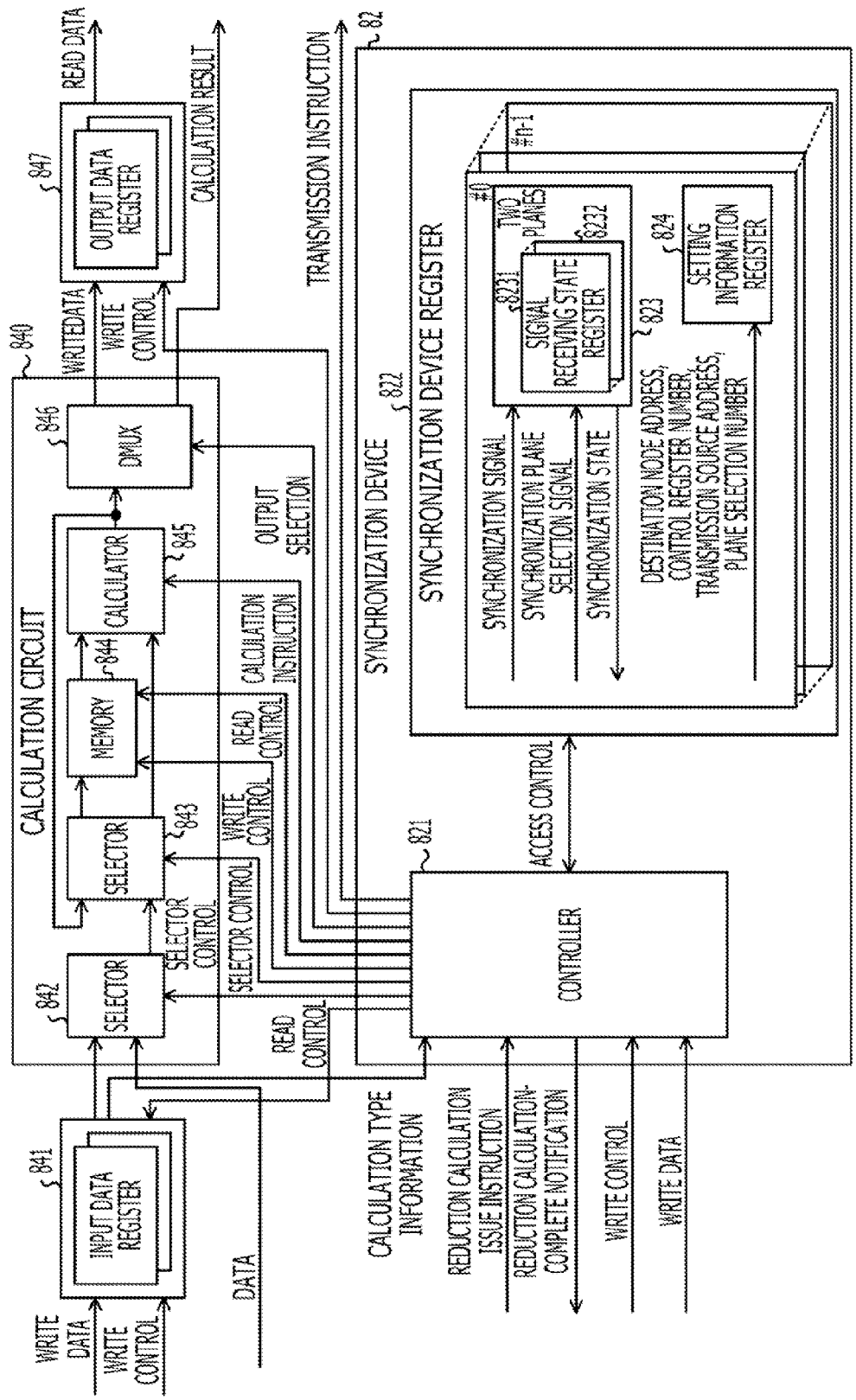
FIG. 11 illustrates a structure of a calculation device (calculator)
Figure 12:
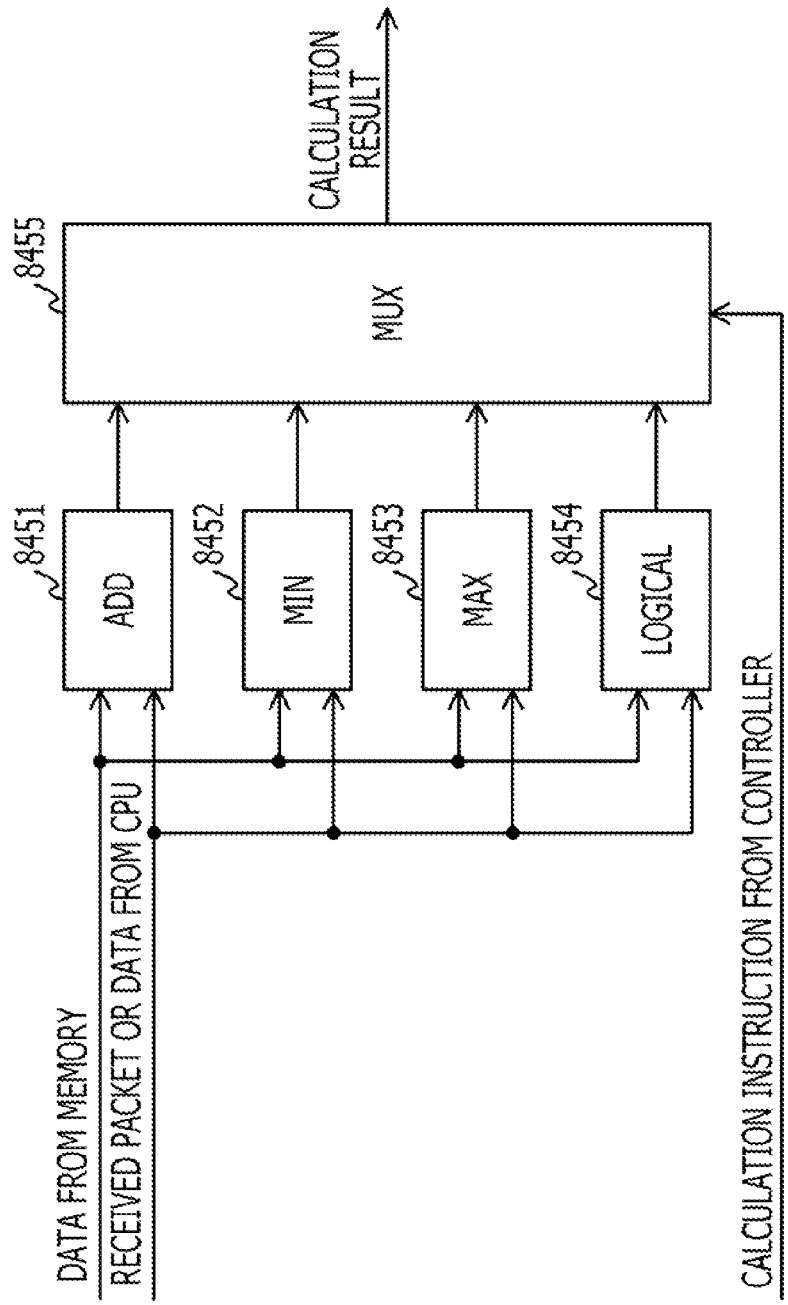
FIG. 12 illustrates a structure of the calculator.

FIG. 9 illustrates a node including the reduction calculation device 8 that performs the reduction calculation while performing the butterfly barrier synchronization. FIG. 10 illustrates a structure of the reduction calculation device 8 of FIG. 9. FIG. 11 illustrates a structure of a reduction calculation unit (calculator) of the reduction calculation device of FIG. 10. FIG. 12 illustrates the calculator included in the reduction calculation device of FIG. 10.

The reduction calculation device 8 of FIG. 9 is arranged in the node 1 forming the parallel computing system of FIG. 1. With reference to FIG. 9, the node 1 includes the reduction calculation device 8 that replaces the barrier synchronization device 6 in the node 1 of FIG. 2. More specifically, the node 1 of FIG. 9 is identical to the node 1 of FIG. 2 except the reduction calculation device 8. Elements previously illustrated in FIGS. 2-4 may not be illustrated or the discussion thereof may be omitted.

The reduction calculation device 8 performs the reduction calculation while establishing the barrier synchronization. The reduction calculation device 8 includes receiver 81, synchronization device 82, transmitter 83, calculation device 84, and loop path 85. The synchronization device 82 includes controller 821 and synchronization device register 822. The calculation device 84 includes calculation circuit 840, input data register 841, and output data register 847. The calculation circuit 840 includes selector 842, selector 843, memory 844, calculator 845, and demultiplexer (DMUX) 846. In the discussion that follows, the synchronization device 82 is also referred to as a "synchronizer 82," the synchronization device register 822 as a "register 822," and the calculation device 84 as a "calculator 84."

The reduction calculation device 8 is identical in structure to the barrier synchronization device 6 except that the reduction calculation device 8 includes the calculator 84. With the calculator 84, the reduction calculation device 8 receives a reduction calculation start signal rather than the barrier synchronization start signal, and then outputs a reduction calculation-complete signal rather than the barrier synchronization-established signal.

With the calculator 84, the reduction calculation device 8 transmits data to and receives data from the network 2 besides transmitting a packet to and receiving a packet from the network 2. The reduction calculation device 8 also exchanges not only control signals but also data with the setting processor 31 in the CPU 3.

The reduction calculation device 8 including the calculator 84 receives target data for the reduction calculation, and outputs reduction calculation results. More specifically, the receiver 81 extracts calculation target data from the data received from at least two synchronization devices, and then inputs the calculation target data to the calculator 84. The calculator 84 performs a calculation operation on the extracted calculation target data and outputs calculation result data to the transmitter 83. The transmitter 83 transmits, to at least two synchronization devices establishing synchronization, data including the calculation result data.

As illustrated in FIG. 10, the synchronizer 82 includes two synchronization resources 820. The two synchronization resources 820 are two signal receiving state registers 823. Each of the two signal receiving state registers 823 includes a first plane signal receiving state register 8231 and a second plane signal signal receiving state register 8232. The two signal receiving state registers 823 are included in each of the registers 822. For example, the synchronization resource #0 is the first plane signal receiving state register 8231 and the synchronization resource #1 is the second plane signal receiving state register 8232.

FIG. 10 diagrammatically illustrates that the synchronizer 82 includes the two synchronization resources 820. In practice, as illustrated in FIG. 11, the two synchronization resources 820 are two registers arranged in each of a plurality of registers 822. FIG. 11 diagrammatically illustrates that the register 822 includes the signal receiving state register 823 including the first plane signal receiving state register 8231 and the second plane signal receiving state register 8232, and the setting information register 824. In other words, the register 822 is substantially identical in structure to the register 622 of FIG. 4.

The setting processor 31 in the CPU 3 inputs first target data of the reduction calculation to the input data register 841 as write data, and the input data register 841 then inputs the received write data to the selector 842 as read data. Second target data of the reduction calculation is input as a packet via the network 2 and the receiver 81, then extracted from the packet, and then input to the selector 842.

The reduction calculation result is output from the demultiplexer 846 to the output data register 847 as write data. The output data register 847 then outputs the result to the setting processor 31 as read data. The reduction calculation result is also output from the demultiplexer 846 to the transmitter 83. The transmitter 83 then transmits the reduction calculation result to the network 2 as a packet.

A plurality of input data registers 841 and a plurality of output data registers 847 may be arranged. The input data registers 841 respectively correspond to the registers 822. The output data registers 847 also respectively correspond to the registers 822.

The setting processor 31 specifies a write address to the input data register 841 on which write data is to be written. The controller 821 specifies a read address to the input data register 841 from which read data is to be read. The read address of the input data register 841 corresponds to the register 822 specified by the destination information in the packet received by the receiver 81, and is generated in accordance with the setting information of the specified register 822. The controller 821 specifies a write address to the output data register 847 on which write data is to be written. The write address of the output data register 847 corresponds to the register 822 used in the reduction calculation of the write data, and is generated in accordance with the setting information of the specified register 822. The setting processor 31 specifies a read address to the output data register 847 from which read data is to be read.

In order to execute the reduction calculation, the setting processor 31 sets in the reduction calculation device 8 a transmission destination of a first barrier synchronization message and a transmission destination of a second barrier synchronization message in accordance with the setting condition input via the IO device 11.

The setting processor 31 transfers calculation target data to the reduction calculation device 8 via the system controller 5 at the start of the reduction calculation, and receives a reduction calculation result from the reduction calculation device 8. The reduction calculation device 8 communicates with the reduction calculation device 8 in another node 1 via the network 2, and performs the reduction calculation in response to communication results.

In order to perform the reduction calculation, the synchronizer 82 in the reduction calculation device 8 instructs the transmitter 83 to transmit the second barrier synchronization message (as labeled "transmission instruction" in FIG. 11) subsequent to the establishment of synchronization, and instructs the calculator 84 to perform a specific reduction calculation. Upon receiving the instruction to transmit the second barrier synchronization message, the transmitter 83 transfers to the setting processor 31 the reduction calculation result from the calculator 845 together with the second barrier synchronization message.

The controller 821 in the synchronizer 82 retains calculation type information. The calculation type information indicates the type of calculation the calculator 845 uses in the control of the reduction calculation. The calculation type information is input to the controller 821 from the CPU 3 via the input data register. The calculation type information is input via the IO device 11 as part of the setting condition.

The reduction calculation is briefly described. The reduction calculation may be performed using substantially the same algorithm as that of the barrier synchronization. The reduction calculation is performed via the butterfly network for the butterfly barrier synchronization.

In the reduction calculation illustrated in FIGS. 27 and 28A and 28B, each process is partitioned into a plurality of stages, and exchanges a signal with another process on a per stage basis. When a single process operates on a single node, the process and the node may be equally handled. The operation and destination of the process at each stage are basically identical to those in the barrier synchronization.

At the first stage #1 in the reduction calculation illustrated in FIG. 31A, each process transmits data as a calculation target to a process at the next stage #2. At the stage #2, each process receives data from a process at the prior stage #1, adds the received data to the data thereof, and then transmits the calculation result to a process at the next stage #3. At the final stage #3, each process receives data from a process at the prior stage #2, and adds the received data to the data thereof. The addition result is the total sum.

In another method of the reduction calculation, data is transmitted to a particular process to cause the process to perform the reduction calculation. In order for all the processes to have calculation results, a node performing a particular process broadcasts data to other nodes performing other processes. The reduction calculation through butterfly is free from broadcasting.

The reduction calculation of the node of FIG. 9 is performed as described below.

In substantially the same manner as the barrier synchronization device 6, the setting processor 31 sets the setting information on the register 822 corresponding to each group of the reduction calculation in the synchronizer 82 in accordance with the setting condition. The setting processor 31 then transfers input data and a reduction synchronization start signal to the calculator 84. The calculator 84 starts the reduction calculation. When the barrier synchronization is established in the register 822 corresponding to the final stage, the reduction calculation device 8 transfers calculation results and a reduction calculation-complete signal to the setting processor 31.

The receiver 81 receives a packet via the network 2, transfers the synchronization signal and the destination information to the synchronizer 82 in response to the received packet, and transfers the data received as the packet to the calculator 84.

The input data register 841 in the calculator 84 temporarily stores input data as a target of the reduction calculation transmitted from the CPU 3 (labeled "input data" in FIG. 10). In response to an instruction from the controller 821, the calculator 84 inputs the stored data as "read data" to the memory 844 via the selector 842. The data from the CPU 3 is input at the start of the reduction calculation as described above.

The memory 844 stores the data input via the input data register 841. The memory 844 thus stores the data under the reduction calculation. The memory capacity of the memory 844 is (number of registers 822)×(number of bits of data). The address of the memory 844 to store the data under the reduction calculation process is a write address provided by the controller 821. The write address of the memory 844 corresponds to the register 822 used in the reduction calculation and is generated in accordance with the setting information of the register 822.

The data under the reduction calculation process stored on the memory 844 is read and input to the calculator 845 when the controller 821 specifies a read address. The read address of the memory 844 corresponds to the register 822 used in the reduction calculation, and is generated in accordance with the setting information of the register 822.

In response to an input unit selection instruction from the controller 821, the selector 842 selects between data from the input data register 841 and data from the receiver 81, and then inputs the selected data to one of the memory 844 and the calculator 845 via the selector 843. The input unit selection instruction functions such that the data from the receiver 81 is output to the selector 842 when the synchronization signal and the destination information from the receiver 81 are input, and such that the read data from the input data register 841 is output to the selector 842 otherwise.

In response to an input-output unit selection instruction from the controller 821, the selector 843 inputs the data from the selector 842 or the data from the calculator 845 to one of the memory 844 and the calculator 845. The input-output unit selection instruction functions such that the data from the selector 842 is selected when the data from the selector 842 is input, and such that the data from the calculator 845 is selected otherwise. The input-output unit selection instruction functions such that the input data is output to the calculator 845 when the synchronization is established, and such that the input data is output to the memory 844 otherwise.

When the synchronization is established, the calculator 845 performs a specific calculation in accordance with the data awaited on the memory 844, the data of the packet input via the selector 842, and preceding calculation results. Upon receiving the instruction from the controller 821 in the synchronizer 82, the calculator 845 performs the reduction calculation on the data stored on the memory 844. More specifically, the calculator 845 performs the specific calculation in response to the calculation instruction from the controller 821, and supplies calculation results to the demultiplexer 846 and the selector 843.

As illustrated in FIG. 12, the calculator 845 includes calculation units 8451-8454 and multiplexer 8455. The calculation units are adder (ADD) 8451, minimum value calculator (MIN) 8452, maximum value calculator (MAX) 8453, and logical OR gate 8454. The calculation units 8451-8454 perform the functions thereof.

The calculator 845 performs a calculation of the instructed type on the first data and the second data. The first is the data input from the memory 844. The second data is the data input from the input data register 841, the data of the packet received by the receiver 81, or the calculation result calculated by the calculator 845 at the prior stage. The calculation units 8451-8454 perform the calculations thereof on the first data and the second data, and outputs the calculation results thereof to the multiplexer 8455. The calculation type information is provided in response to a calculation instruction from the controller 821. The calculation instruction is generated by the controller 821 in response to calculation type information indicating the type of calculation. In response to the calculation instruction, the multiplexer 8455 selects and outputs one of the calculation results provided by the calculation units 8451-8454.

In response to an output selection instruction from the controller 821, the demultiplexer 846 inputs an output from the calculator 845 to one of the output data register 847 and the transmitter 83. The output selection instruction functions such that the data from the calculator 845 is output to the transmitter 83 prior to the completion of the reduction calculation, and such that the data from the calculator 845 is output to the output data register 847 otherwise.

The output data register 847 outputs the results of the reduction calculation to the CPU 3. The reduction calculation results output from the output data register 847 are input to the CPU 3 at the end of the reduction calculation.

The transmitter 83 receives the calculation results from the demultiplexer 846 in the calculation circuit 840. Upon receiving a transmission instruction from the controller 821, the transmitter 83 transmits the packet, generated in response to the transmission instruction, to the network 2.

In substantially the same manner as the synchronizer 62 in the barrier synchronization device 6, the synchronizer 82 modifies a transmission destination of interim results on a per stage basis. The controller 821 in the synchronizer 82 receives the message of the barrier synchronization and the setting information from the receiver 81, and transfers the message of the barrier synchronization to the register 822 corresponding to the received setting information.

With synchronization established, the controller 821 outputs a transmission instruction of the message of the barrier synchronization to the transmitter 83. The transmission instruction of the message of the barrier synchronization is labeled "transmission instruction" in FIG. 10. Besides transferring the message of the barrier synchronization to the register 822 specified in the synchronizer 82 of own process or own node 1, the controller 821 controls the calculator 84. More specifically, the controller 821 performs the reduction calculation between the data input to the calculator 84 and the data awaited on the memory 844. When the barrier synchronization is not established, the controller 821 causes the memory 844 to store data.

The message of the barrier synchronization may be transferred to the register 822 specified in the synchronizer 82 of own process or own node 1, and the barrier synchronization may be established. The controller 821 then controls the calculator 84 to repeat the reduction calculation on the calculation results and the data awaited on the memory 844. When no synchronization is established, the controller 821 transfers the calculation results to the memory 844.

Upon receiving a reduction calculation start signal from the setting processor 31, the controller 821 transfers the message of the barrier synchronization and the data input from the setting processor 31 to the specified group, e.g., the transmission destination of the register 822. When the barrier synchronization is established at the final group later, the controller 821 transfers the calculation results and a reduction calculation-complete signal to the setting processor 31.

Figure 13:
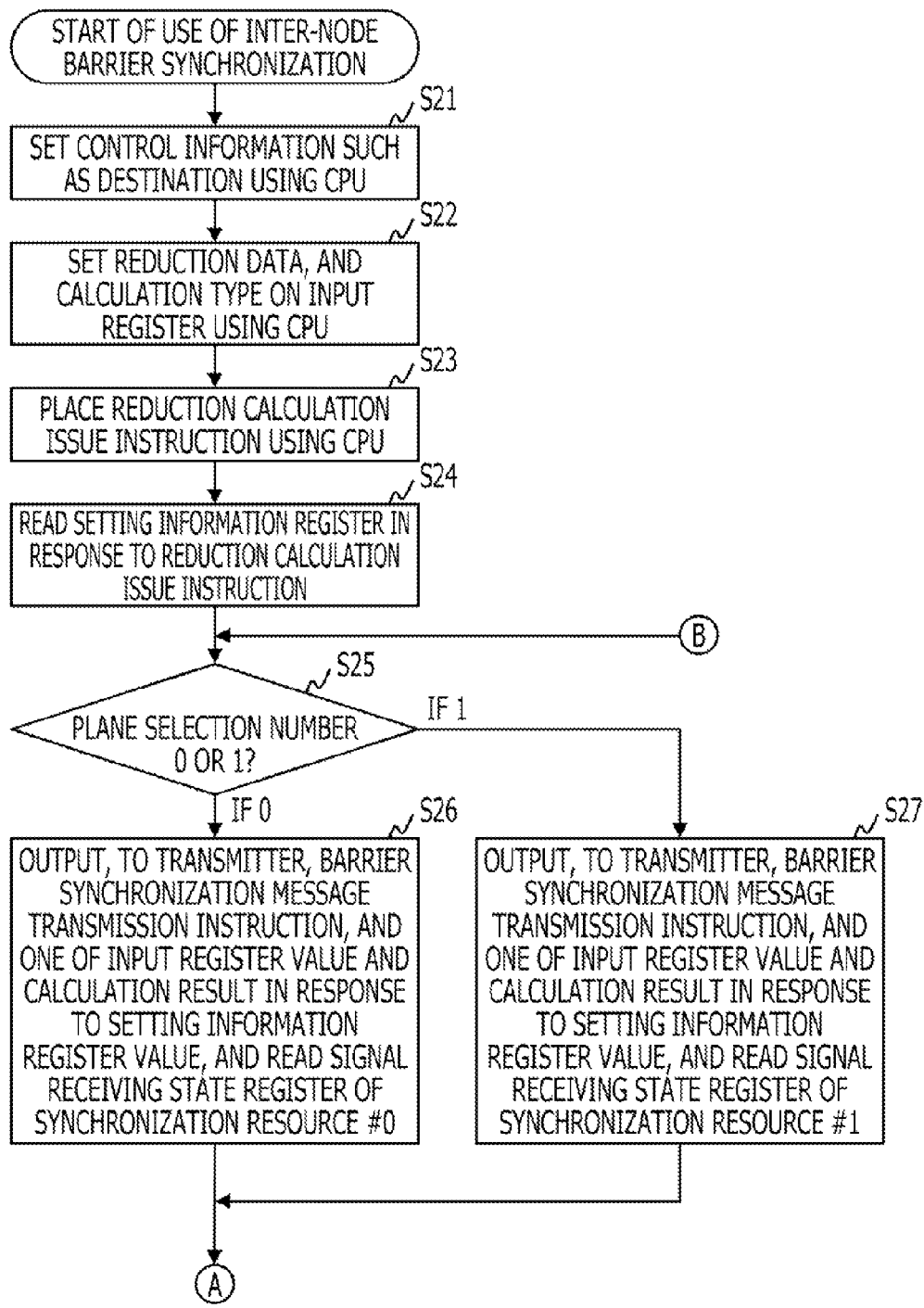
FIG. 13 is a process flowchart of a reduction calculation process.
Figure 14:
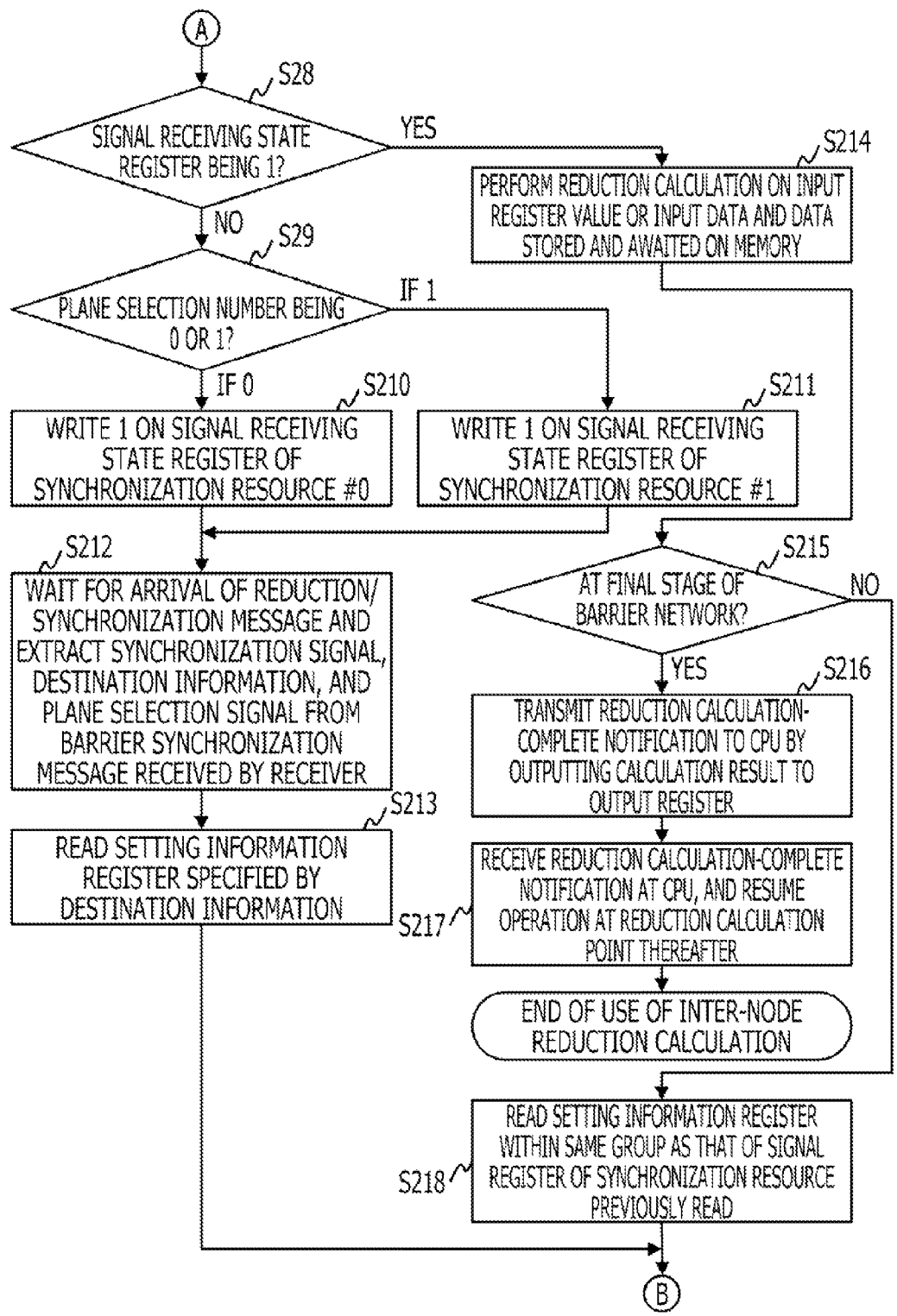
FIG. 14 is a continuation of the process flowchart of FIG. 13.

FIG. 13 illustrates a process flow of the reduction calculation device 8 of FIG. 9. The reduction calculation device 8 performs the reduction calculation while performing the butterfly barrier synchronization.

The reduction calculation is performed making use of the barrier synchronization. The process flow of FIG. 13 is substantially identical to the process flow of FIG. 7 except a transmission and reception operation of the data of the reduction calculation target (S22) and a reduction calculation operation (S214). The process flow other than S22 and S214 is only briefly discussed here.

Prior to the start of the barrier-synchronization based reduction calculation, the setting processor 31 in the CPU 3 determines the assignment of the register 822 in accordance with the algorithm of the barrier-synchronization based reduction calculation and the setting condition. The setting processor 31 sets the setting information for the next stage through butterfly on the setting information register 824 of each register 822 (S21).

To start the reduction calculation, the CPU 3 transfers, to the input data register 841, input data of the reduction calculation, in other words, reduction data and calculation type information (S22). The input data register 841 inputs the reduction data to the selector 842, and the calculation type information to the controller 821.

If the process arrives at the barrier point, the CPU 3 transfers to the synchronizer 82 a reduction calculation start signal, e.g., a message of the reduction calculation including the synchronization signal (S23). The reduction calculation start signal includes an input register number and setting information corresponding to the first stage.

Upon receiving the reduction calculation start signal, the controller 821 in the synchronizer 82 reads a value at the setting information register 824 in the register 822 corresponding to the number specified by the reduction calculation start signal (S24).

The controller 821 reads the least significant bit of the sequence number of the reduction start signal, e.g., the synchronization plane selection information, and determines whether the value of the read synchronization plane selection information is "0" or "1" (S25).

If the value of the synchronization plane selection information is "0," the controller 821 outputs a packet transmission instruction to the transmitter 83 in response to the value specifying the register 822 of the other node 1 within the value of the setting information register 824 (S26). In response to the value specifying the register 822 of own node 1 within the value of the setting information register 824, the transmitter 83 reads a value at the first plane signal receiving state register 8231 as the synchronization resource #0 of the register 822 specified by the setting information register 824 (S26).

If the value of the synchronization plane selection information is "1," the controller 821 outputs a signal of a packet transmission instruction to the transmitter 83 in accordance with the value specifying the register 822 of the other node 1 within the value of the setting information register 824 (S27). In accordance with the value specifying the register 822 of own node 1 within the value of the setting information register 824, the transmitter 83 reads a value at the second plane signal receiving state register 8232 as the synchronization resource #1 of the register 822 specified by the setting information register 824 (S27).

The synchronizer 82 determines whether "1" indicating the synchronization state is set in the signal receiving state register 823 of the next stage (S28). When "1" is set in the receiving state register 823 (yes from S28), synchronization is established. When "1" is not set in the receiving state register 823 (no from S28), no synchronization is established.

If no synchronization is established (no from S28), the controller 821 reads the least significant bit of the sequence number of the reduction calculation start signal, i.e., the synchronization plane selection information, and determines whether the value of the read synchronization plane selection information is "0" or "1" (S29).

If the value of the synchronization plane selection information is "0," the controller 821 writes "1" on the signal receiving state register 823 as the synchronization resource #0 at the register 822 of the next stage specified by the setting information register 824 (S210). When the value of the synchronization plane selection information is "1," the controller 821 writes "1" on the signal receiving state register 823 as the synchronization resource #1 at the register 822 of the next stage specified by the setting information register 824 (S211).

The synchronizer 82 awaits the packets, and the receiver 81 receives the packets. The receiver 81 extracts the setting information becoming the synchronization plane selection information, the synchronization signal, and the destination information in accordance with the received packet, and outputs the extracted information to the synchronizer 82 (S212).

Upon receiving the signal from the receiver 81, the controller 821 in the synchronizer 82 reads the value at the setting information register 824 of the specified register 822 (S213). Processing returns to S25.

When "1" is set in the receiving state register 823 in S28, in other words, when the synchronization has been established (yes from S28), the calculation circuit 840 performs the reduction calculation (S214). The data as the target of the reduction calculation is a value at the input data register when the register 822 corresponds to a next stage subsequent to the first stage. The data as the target of the reduction calculation is data included in the packet when the register 822 corresponds to a stage subsequent to the next stage and a factor establishing synchronization is the synchronization signal. When the received synchronization signal is the message of the barrier synchronization from own process or own node 1, the reduction calculation is performed between the calculation results of the prior stage, and the data stored at an address within the memory 844 corresponding to the register 822 with synchronization established. When the received information is the calculation results, the type of the calculation is specified in accordance with the calculation type information input from the input data register to the controller 821.

The controller 821 determines whether the register 822 corresponds to the final stage (S215). When the synchronization is established in the register 822 corresponding to the final stage (yes from S215), the controller 821 outputs reduction calculation results to the output data register, and transfers a reduction calculation-complete signal to the CPU 3 (S216). The CPU 3 receives the reduction calculation-complete signal and learns that the reduction calculation has been completed (S217).

If it is determined in S215 that the register 822 does not correspond to the final stage (no from S215), the controller 821 reads the value at the setting information register 824 of the register 822 of the receiving state register 823 read in S26 or S27 (S218). Processing returns to S25.

FIGS. 15A-15C through FIGS. 26A-26C illustrate the flow of the message of the barrier synchronization from stage to stage in the butterfly barrier synchronization illustrated in FIG. 7 and the reduction calculation based on the butterfly barrier synchronization.

FIGS. 15A-15C through FIGS. 26A-26C illustrate the butterfly barrier synchronization performed among three processes #0, #1, and #2 and the reduction calculation performed in accordance with the butterfly barrier synchronization. As illustrated in FIGS. 15A-15C through FIGS. 26A-26C, the same register 622 is used at the start point stage and the end point stage. The start point stage and the end point stage are labeled "start and end point stages" as illustrated in FIG. 17A and other figures. The stages other than the start and end point stages are labeled "intermediate stages" as illustrated in FIG. 17A and other figures. The three processes #0, #1, and #2 are enclosed by broken lines only in FIG. 15A.

Stage #58 is used as an intermediate stage for the process #0, stage #63 is used as an intermediate stage for the process #1, and stage #52 is used as an intermediate stage for the process #2.

Figure 15A:
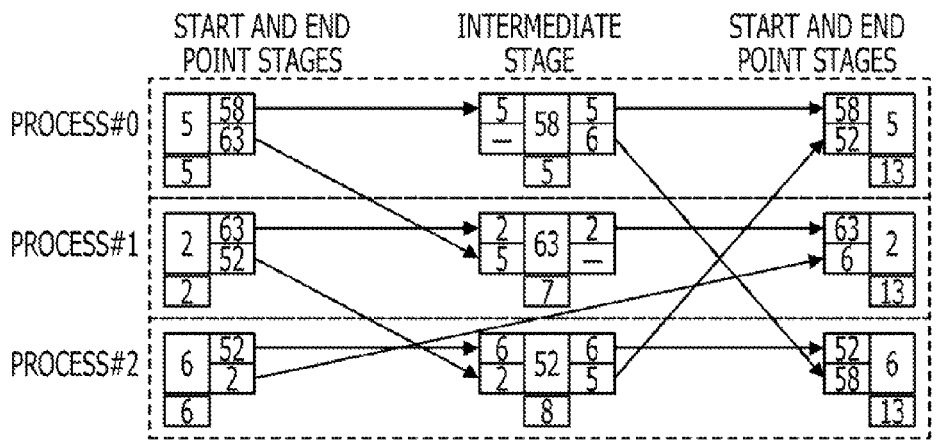
FIGS. 15A-15C illustrate a signal flow in a barrier synchronization and a reduction calculation.
Figure 15B:
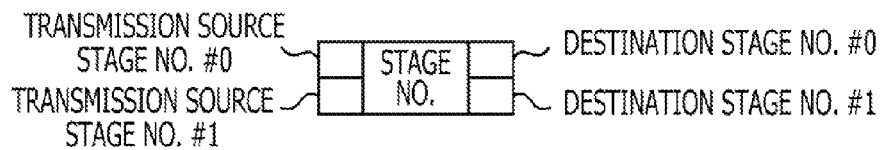

In view of the barrier synchronization through butterfly, three stages #5, #2, and #6 as the start and end point stages in FIGS. 15A-15C through FIGS. 26A-26C are illustrated in the form of FIG. 15B, and the stages #58, #63, and #52 as the intermediate stages are also illustrated in the form of FIG. 15B.

Figure 15C:
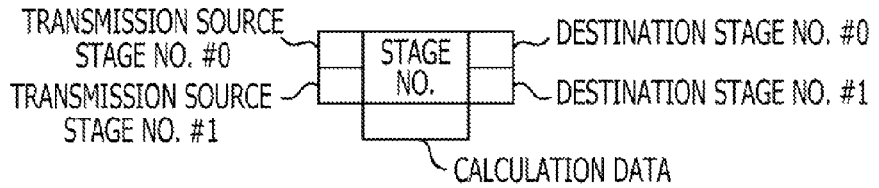

In view of the reduction calculation based on the barrier synchronization through butterfly, three stages #5, #2, and #6 as the start and end point stages in FIGS. 15A-15C through FIGS. 26A-26C are illustrated in the form of FIG. 15C, and stages #58, #63, and #52 as the intermediate stages are also illustrated in the form of FIG. 15C.

The following discussion of the reduction calculation based on the butterfly barrier synchronization also serves as the discussion of the butterfly barrier synchronization.

As illustrated in FIGS. 17A-17C through FIGS. 26A-26C, a check operation of the consistency of the received packet and the sequence number is performed together with the reduction calculation based on the butterfly barrier synchronization. This is because the sequence number of the packet received by each process is not necessarily correct. The check circuit 6211 in the controller 621 checks the consistency between the sequence number of the received packet and the number of packets received at the stage. When the check results indicate that the sequence number is consistent with the number of packets, one of the two receiving state registers 623 is selected in accordance with the synchronization plane selection information.

FIG. 16 illustrates the consistency between the sequence number and the number of packets.

As illustrated in FIG. 16, a difference at the start and end point stage where the message of the barrier synchronization remains unissued is calculated through equation: (sequence number of packet)−(sequence number of stage). A difference at the start and end point stage where the message of the barrier synchronization is issued is calculated through equation: (sequence number of packet)−(sequence number of stage)+1.

A difference at a stage, other than the start and end point stages, where the message of the barrier synchronization remains unissued is calculated through equation: (sequence number of packet)−(sequence number of stage). A difference at a stage, other than the start and end point stage, where the message of the barrier synchronization is issued is calculated through equation: (sequence number of packet)−(sequence number of stage). Depending on the barrier issued/unissued state, the difference changes between the start and end point stage and the stage other than the start and end point stage. This is because the sequence number of the stage is incremented by "+1" when the packet is transmitted at the stage.

The check circuit 6211 calculates the difference as described above, and compares the calculated difference with the value of the receiving stage register (in other words, the number of flags). The number of flags is described below. When the comparison operation results in a match, the check circuit 6211 determines that the sequence number of the received packet is correct, and selects one of the two receiving state registers 623 in accordance with the synchronization plane selection information.

The butterfly barrier synchronization, the reduction calculation based on the butterfly barrier synchronization, and the check of the sequence number of the received packet are performed among the three processes #0, #1, and #2. These operations are described with reference to FIGS. 17A-17C through FIGS. 26A-26C.

As illustrated in FIGS. 17A-17C through FIGS. 26A-26C, the butterfly barrier synchronization and the reduction calculation are performed using the first plane signal receiving state register 8231 (hereinafter referred to as "operations using the first plane"). The processes #0, #1, and #2 issue the message of the barrier synchronization, and the barrier synchronization is established on the processes #0 and #2. Operation is delayed at stage #63. As illustrated in FIGS. 17A-17C through FIGS. 26A-26C, as a result of delay at stage #63, the processes #0 and #2 issue the message of the barrier synchronization, in the butterfly barrier synchronization and the reduction calculation are performed using the second plane signal receiving state register 8232 (hereinafter referred to as "operations using the second plane"). In the operation using the first plane, the barrier synchronization is established on the process #1.

FIG. 17A illustrates a state prior to the issue of the message of the barrier synchronization in the operation using the first plane. FIG. 17B illustrates a state prior to the issue of the message of the barrier synchronization in the operation using the second plane. FIG. 17C illustrates the stages of the first plane signal receiving state register 8231 and the second plane signal receiving state register 8232 in the states of FIG. 17A and FIG. 17B. The same is true of FIGS. 18A-18C, FIGS. 19A-19C, FIGS. 21A-21C, FIGS. 22A-22C, FIGS. 24A-24C, and FIGS. 26A-26C. In the discussion that follows, the first plane signal receiving state register 8231 is referred to as a "first plane register 8231," and the second plane signal receiving state register 8232 is referred to as a "second plane register 8232."

As illustrated in FIGS. 17A and 17B, the processes #0, #1, and #2 do not reach the barrier point. As illustrated in FIG. 17C, flags at region L, region R, and region S are reset to "0" in the first plane register 8231. The flag at the region L is set to "1" indicating that a packet has been received from a local node (own node). The flag at the region R is set to "1" indicating that a packet has been received from a remote node (another node). The flag at the region S is set to "1" indicating that a packet is transmitted at only the start and end point stage.

As illustrated in FIG. 17C, the actual sequence number of the packet processed at each stage is "36a" at the time points of FIGS. 17A and 17B. The sequence number of the packet at the issue in the operation using the first plane is "36a," and the sequence number of the packet at the synchronization establishment is "36a."

In the operation using the first plane, the processes #0, #1, and #2 reach the barrier point, and the message of the barrier synchronization is issued as illustrated in FIG. 18A. No change takes place in the operation using the second plane as illustrated in FIG. 18B.

As illustrated in FIG. 18C, the message of the barrier synchronization is issued at the start and end point stages #5, #2, and #6. The flag "1" is set in the region S of each of the first plane registers 8231 used at the stages #5, #2, and #6. The actual sequence number of the packet processed at each stage is set to be "36b." The sequence number of the packet at the next issue at each of the stages #5, #2, and #6 is set to be "36c."

The operation using the first plane is in progress at the stages #5, #2, #6, #58, and #52, and the barrier synchronization is established as illustrated in FIG. 19A. At the intermediate stage #63, operation is delayed. No change takes place in the operation using the second plane as illustrated in FIG. 19B. Since two packets are received at stages #5 and #6 as illustrated in FIG. 19C, "1" is set at the flags in the region L and the region R in each of the first plane register 8231 used at stages #5 and #6.

Before the above described operation, a difference value DIFF between a sequence number "0x36a" of the packet from stage #6 and a sequence number "0x36b" of stage #2 is calculated at stage #2 as illustrated in FIG. 20. In this case, (sequence number of the packet from stage #6−sequence number of stage #2)+1=(0x36a−0x36b)+1=0, and the difference value DIFF is 0. The difference value DIFF is compared with the number of packets received at stage #2 in the operation using the first plane and the operation using the second plane. The number of packets received at stage #2 is calculated from the number of packets in the state of FIG. 18C as illustrated in FIG. 20. When the difference value DIFF is equal to the number of the packets received at stage #2, it is determined that the correct packet has been received, and the packet reception operation is performed. The first plane register 8231 of stage #2 is updated from the state of FIG. 18C to the state of FIG. 19C.

The sequence number check of the received packet is performed not only at stage #2 but also each of the other stages. In the discussion that follows, the sequence number check is applied to stage #2.

The operation using the first plane is in progress at stage #5 and stage #6, and ends together with the barrier synchronization completion as illustrated in FIG. 21A. More specifically, the barrier synchronization is established at states #5 and #6 as illustrated in FIG. 21C, the flag "1" of each of the regions L, R, and S is reset in each of the first plane register 8231 used at stages #5 and #6. Operation is still delayed at the intermediate stage #63. The flag remains set in the regions R and S of the first plane register 8231 used at stage #2. No change takes place in the operation using the second plane as illustrated in FIG. 21B.

Operation is in progress and reaches the barrier point at stages #0 and #2. The message of the barrier synchronization is issued. Operation is still delayed at the intermediate stage #63.

Since "1" is set at the flag of at least one of the first plane registers 8231 used at stage #2, with which stages #5 and #6 synchronize with, the second plane register 8232 is used as illustrated in FIG. 22C. In other words, when all the values stored at the first plane register 8231 are not "0's," the first plane register 8231 is not used for a new barrier synchronization. The operation using the second plane thus starts. More specifically, a flag "1" is set in the region S in each of the second plane registers 8232 used at stages #5 and #6. The actual sequence number of the packet processed at stages #5 and #6 is set to be "36c."

The message of the barrier synchronization from stage #6 reaches at stage #2 as illustrated in FIG. 22B. The message of the barrier synchronization used in the operation using the second plane arrives before the barrier synchronization is established in the operation using the first plane. As illustrated in FIG. 22C, the value at the first plane register 8231 is prevented or inhibited from being destroyed through overwriting, and is stored at a correct state. A flag "1" is set in the region R of the second plane register 8232 used at stage #2.

Figure 23:
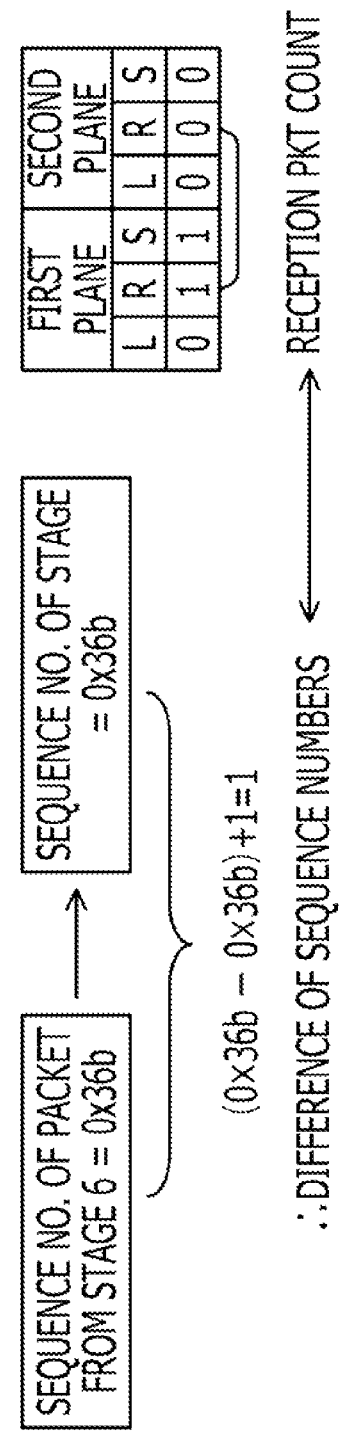
FIG. 23 illustrates a signal flow in the barrier synchronization and the reduction calculation.

A difference value DIFF between a sequence number "0x36b" of the packet from stage #6 and a sequence number "0x36b" of stage #2 is calculated at stage #2 as illustrated in FIG. 23. In this case, (sequence number of the packet from stage #6−sequence number of stage #2)+1=(0x36b−0x36b)+1=1, and the difference value DIFF is 1. The difference value DIFF is compared with the number of packets received at stage #2 in the operation using the first plane and the operation using the second plane. The number of packets received at stage #2 is calculated from the number of packets in the state of FIG. 21C as illustrated in FIG. 23. When the difference value DIFF is equal to the number of the packets received at stage #2, it is determined that the correct packet has been received. The second plane register 8232 of stage #2 is updated from the state of FIG. 21C to the state of FIG. 22C.

Operation is in progress at the intermediate stage #63, and the message of the barrier synchronization is issued. Operation is thus in progress at stage #2 of the operation using the first plane, and the barrier synchronization is established as illustrated in FIG. 24A. A flag "1" is set at the region L of the first plane register 8231 used at stage #2.

Figure 25:
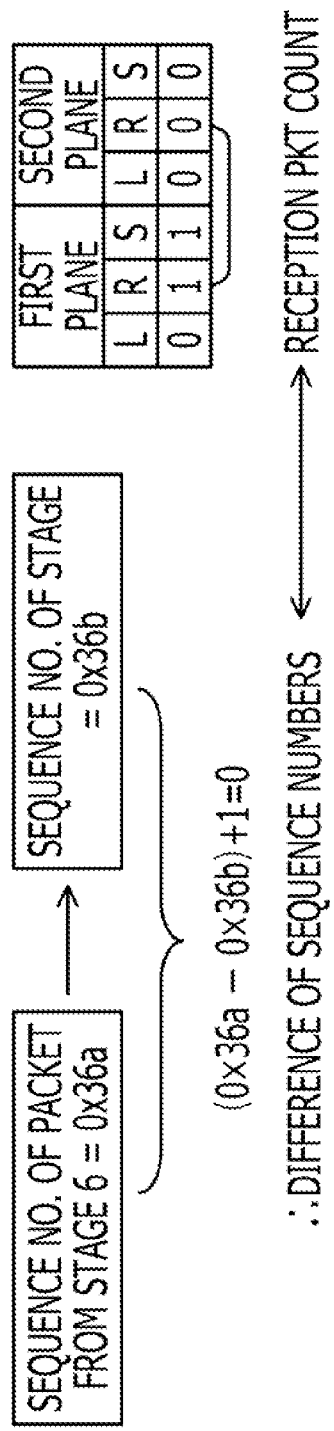
FIG. 25 illustrates a signal flow in the barrier synchronization and the reduction calculation.

A difference value DIFF between a sequence number "0x36a" of the packet from stage #6 and a sequence number "0x36b" of stage #2 is calculated at stage #2 as illustrated in FIG. 25. In this case, (sequence number of the packet from stage #6−sequence number of stage #2)+1=(0x36a−0x36b)+1=0, and the difference value DIFF is 0. The difference value DIFF is compared with the number of packets received at stage #2 in the operation using the first plane and the operation using the second plane. The number of packets received at stage #2 is calculated from the number of packets in the state of FIG. 22C as illustrated in FIG. 25. When the difference value DIFF is equal to the number of the packets received at stage #2, it is determined that the correct packet has been received. The second plane register 8232 of stage #2 is updated from the state of FIG. 22C to the state of FIG. 24C.

The operation using the first plane is in progress at stage #2, and ends together with the barrier synchronization completion as illustrated in FIG. 26A. More specifically, the barrier synchronization is established at state #2 as illustrated in FIG. 26C, a flag "1" is reset in each of the regions L, R, and S in each of the first plane register 8231 used at stage #2. No change takes place in the operation using the second plane as illustrated in FIG. 26B. The first plane register 8231 may be used again.

The algorithm of the barrier synchronization is butterfly in the parallel computing system. The barrier synchronization in the parallel computing system is not limited to the butterfly barrier synchronization.

The algorithm of the barrier synchronization may be dissemination. The barrier synchronization may be performed through dissemination in the parallel computing system. The reduction calculation may be performed based on the dissemination barrier synchronization.

The algorithm of the barrier synchronization may be a pairwise exchange with recursive doubling. Even if the number of processes is not a power of 2, the barrier synchronization through the pairwise exchange with recursive doubling may be performed in the parallel computing system. The reduction calculation may be performed based on the barrier synchronization through the pairwise exchange with recursive doubling.

The barrier synchronization device is arranged in each node, e.g., in a processor in the parallel computing system. The invention is not limited to this arrangement.

In the parallel computing system including multi-processors (multi-processor core), the barrier synchronization device may be arranged separately from the nodes or the processor cores. In other words, a single barrier synchronization device may be commonly shared by a plurality of processor cores. In the parallel computing system including the multi-processors, the reduction calculation device may be arranged separately from the nodes or the processor cores. In other words, a single reduction calculation device may be commonly shared by a plurality of processor cores.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A parallel computing system including a plurality of nodes each provided with a synchronization device that establishes synchronization by awaiting incoming data and transmitting the data when all awaited data is received, each synchronization device comprising:
    a receiver that receives data from at least two synchronization devices establishing synchronization, and extracts synchronization information and register selection information from the received data, the register selection information indicating one of the first synchronization and second synchronization;
    a transmitter that transmits data to each of the at least two synchronization devices from among a plurality of synchronization devices;
    a first receiving state register that stores the extracted synchronization information of the first synchronization;
    a second receiving state register that stores the extracted synchronization information of the second synchronization; and
    a controller that
    stores the extracted synchronization information into the first receiving state register and the second receiving state register alternately based on the register selection information, and
    controls the transmitter to transmit data including the register selection information to each of the at least two synchronization devices when the extracted synchronization information is stored in one of the first receiving state register and the second receiving state register.

2. The parallel computing system according to claim 1, wherein
    the receiver of each of the synchronization devices receives data from each of the at least two synchronization devices including its own node and establishes synchronization among the plurality of synchronization devices, and
    the transmitter of each of the synchronization devices transmits data to each of the at least two synchronization devices including its own node and establishing synchronization among the plurality of synchronization devices.

3. The parallel computing system according to claim 2, wherein
    the synchronization device includes a loop path connecting the transmitter to the receiver, and
    the transmitter of each of the synchronization devices transmits the data to its own node via the loop path.

4. The parallel computing system according to one of claim 1, wherein
    the receiver of each of the synchronization devices extracts calculation target data from the data received from the at least two synchronization devices,
    each of the synchronization devices comprises a reduction calculation unit that calculates the calculation target data and outputs the calculated data, and
    the transmitter of each of the synchronization devices transmits to the at least two synchronization devices data including the calculated data.

5. The parallel computing system according to claim 1, wherein
    the controller of each of the synchronization devices causes the transmitter to transmit the data to the at least two synchronization devices when one of the first receiving state register and the second receiving state register stores the synchronization information from all the synchronization devices establishing synchronization.

6. The parallel computing system according to claim 1, wherein
    a plurality of synchronization devices included in a first group establish synchronization, and a plurality of synchronization devices included in a second group establish synchronization after synchronization is established among the synchronization devices in the first group.

7. A synchronization device in a parallel computing system including a plurality of nodes each provided with a synchronization device that establishes synchronization by awaiting incoming data and transmitting the data when all awaited data is received, the synchronization device comprising:
    a receiver that receives data from at least two synchronization devices establishing synchronization, and extracts synchronization information and register selection information from the received data, the register selection information indicating one of first synchronization and second synchronization;
    a transmitter that transmits data to each of the at least two synchronization devices from among a plurality of synchronization devices;
    a first receiving state register that stores the extracted synchronization information of the first synchronization;
    a second receiving state register that stores the extracted synchronization information of the second synchronization; and
    a controller that stores
    the extracted synchronization information into the first receiving state register and the second receiving state register alternately based on the register selection information, and
    controls the transmitter to transmit data including the register selection information to each of the at least two synchronization devices when the extracted synchronization information is stored in one of the first receiving state register and the second receiving state register.

8. The synchronization device according to claim 7, wherein
    the receiver of each of the synchronization devices receives data from each of the at least two synchronization devices including its own node and establishes synchronization among the plurality of synchronization devices, and
    the transmitter of each of the synchronization devices transmits data to each of the at least two synchronization devices including its own node and establishing synchronization from among the plurality of synchronization devices.

9. The synchronization device according to claim 8, wherein
the synchronization device includes a loop path connecting the transmitter to the receiver, and
the transmitter of each of the synchronization devices transmits the data to its own node via the loop path.

10. The synchronization device according to one of claim 7, wherein
the receiver of each of the synchronization devices extracts calculation target data from the data received from the at least two synchronization devices,; wherein
each of the synchronization devices comprises a reduction calculation unit that calculates the calculation target data and outputs the calculated data, and
the transmitter of each of the synchronization devices transmits to the at least two synchronization devices data including the calculated data.

11. The synchronization device according to claim 7, wherein
the controller of each of the synchronization devices causes the transmitter to transmit the data to the at least two synchronization devices when one of the first receiving state register and the second receiving state register stores the synchronization information from all the synchronization devices establishing synchronization.

12. A method of controlling a parallel computing system including a plurality of nodes each provided with a synchronization device that establishes synchronization by awaiting incoming data and transmitting the data when all awaited data is received, the method comprising:
receiving data from at least two synchronization devices establishing synchronization;
extracting synchronization information and register selection information from the received data, the register selection information indicating one of first synchronization and second synchronization;
storing the extracted synchronization information into a first receiving state register and a second receiving state register alternately based on the register selection information, and the first receiving state register being for storing the extracted synchronization information of the first synchronization, the second receiving state register being for storing the extracted synchronization information of the second synchronization; and
transmitting data including the register selection information to each of the at least two synchronization devices when the extracted synchronization information is stored in one of the first receiving state register and the second receiving state register.

* * * * *